US010550252B2

(12) United States Patent
Beaulieu et al.

(10) Patent No.: US 10,550,252 B2
(45) Date of Patent: Feb. 4, 2020

(54) BIMODAL PE RESINS WITH IMPROVED MELT STRENGTH

(71) Applicant: Chevron Phillips Chemical Company LP, The Woodlands, TX (US)

(72) Inventors: William B. Beaulieu, Tulsa, OK (US); Errun Ding, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/492,354

(22) Filed: Apr. 20, 2017

(65) Prior Publication Data
US 2018/0305529 A1  Oct. 25, 2018

(51) Int. Cl.
*C08L 23/08* (2006.01)

(52) U.S. Cl.
CPC ....... *C08L 23/083* (2013.01); *C08L 2205/025* (2013.01); *C08L 2207/066* (2013.01); *C08L 2207/068* (2013.01); *C08L 2314/02* (2013.01); *C08L 2314/06* (2013.01)

(58) Field of Classification Search
CPC .................................................. C08L 23/083
See application file for complete search history.

(56) References Cited

U.S. PATENT DOCUMENTS

| | | |
|---|---|---|
| 3,119,569 A | 1/1964 | Baricordi |
| 3,248,179 A | 4/1966 | Norwood |
| 3,887,494 A | 6/1975 | Dietz |
| 3,900,457 A | 8/1975 | Witt |
| 3,984,610 A * | 10/1976 | Elston ................... C08F 210/18 526/143 |
| 4,053,436 A | 10/1977 | Hogan et al. |
| 4,081,407 A | 3/1978 | Short et al. |
| 4,151,122 A | 4/1979 | McDaniel et al. |
| 4,152,503 A | 5/1979 | Short et al. |
| 4,177,162 A | 12/1979 | McDaniel et al. |
| 4,247,421 A | 1/1981 | McDaniel et al. |
| 4,248,735 A | 2/1981 | McDaniel et al. |
| 4,277,587 A | 7/1981 | McDaniel et al. |
| 4,294,724 A | 10/1981 | McDaniel |
| 4,364,842 A | 12/1982 | McDaniel et al. |
| 4,365,855 A | 12/1982 | Mark |
| 4,382,022 A | 5/1983 | McDaniel |
| 4,444,965 A | 4/1984 | McDaniel et al. |
| 4,501,885 A | 2/1985 | Sheik et al. |
| 4,504,638 A | 3/1985 | McDaniel et al. |
| 4,588,790 A | 5/1986 | Jenkins, III et al. |
| 4,735,931 A | 4/1988 | McDaniel et al. |
| 4,820,785 A | 4/1989 | McDaniel et al. |
| 4,939,217 A | 7/1990 | Stricklen |
| 4,966,951 A | 10/1990 | Benham et al. |
| 4,981,831 A | 1/1991 | Knudsen et al. |
| 5,191,132 A | 3/1993 | Patsidis et al. |
| 5,210,352 A | 5/1993 | Alt et al. |
| 5,347,026 A | 9/1994 | Patsidis et al. |
| 5,352,749 A | 10/1994 | DeChellis et al. |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,455,314 A | 10/1995 | Burns et al. |
| 5,496,781 A | 3/1996 | Geerts et al. |
| 5,498,581 A | 3/1996 | Welch et al. |
| 5,504,171 A | 4/1996 | Etherton et al. |
| 5,508,319 A * | 4/1996 | DeNicola, Jr. ............. C08J 3/28 522/161 |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,693,713 A | 12/1997 | Hoxmeier |
| 5,705,478 A | 1/1998 | Boime |
| 5,705,579 A | 1/1998 | Hawley et al. |
| 6,174,971 B1 | 1/2001 | Chen et al. |
| 6,187,880 B1 | 2/2001 | Welch et al. |
| 6,239,235 B1 | 5/2001 | Hottovy et al. |
| 6,262,191 B1 | 7/2001 | Hottovy et al. |
| 6,300,451 B1 * | 10/2001 | Mehta .................... C08F 210/18 526/127 |
| 6,486,274 B1 | 11/2002 | Gray et al. |

(Continued)

OTHER PUBLICATIONS

"Group notation revised in periodic table," Feb. 4, 1985, pp. 26-27, Chemical & Engineering News.

Alt, Helmut G., et al., "C1-Bridged fluorenylidene cyclopentadienylidene complexes of the type (C13H8-CR1R2-C5H3R)ZrCl2 (R1, R2=alkyl, phenyl, alkenyl; R=H, alkyl, alkenyl, substituted silyl) as catalyst precursors for the polymerization of ethylene and propylene," Journal of Organometallic Chemistry, 1998, pp. 87-112, vol. 568, Elsevier Science S.A.

Alt, Helmut G., et al., "C1-verbrückte Fluorenyliden—Indenylidenkomplexe des Typs (C13H8-CR2-C9H6_nR'n) ZrCl2 (n=0, 1; R=Me, Ph, Butenyl; R'=Alkyl, Alkenyl) als Metallocenkatalysatorvorstufen für die Ethylenpolymerisation," Journal of Organometallic Chemistry, 1998, pp. 153-181, vol. 562, Elsevier Science S.A.

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

(Continued)

Primary Examiner — Irina Krylova
(74) *Attorney, Agent, or Firm* — Conley Rose, P.C.

(57) ABSTRACT

A method comprising introducing a polymerization feed comprising an α-olefin, a diluent, and a diene to a polymerization system, under polymerization conditions, whereby a polymer product is produced, wherein the diene is present at a level in the range of from about 1 ppm to about 1000 ppm based on the diluent.

25 Claims, 4 Drawing Sheets

(56) References Cited

U.S. PATENT DOCUMENTS

| | | | |
|---|---|---|---|
| 6,509,427 B1 | 1/2003 | Welch et al. | |
| 6,509,431 B1* | 1/2003 | Duttweiler | C08F 210/18 |
| | | | 526/129 |
| 6,833,415 B2 | 12/2004 | Kendrick et al. | |
| 7,026,494 B1 | 4/2006 | Yang et al. | |
| 7,064,225 B2 | 6/2006 | Thorn et al. | |
| 7,101,936 B2 | 9/2006 | Weng et al. | |
| 7,226,886 B2 | 6/2007 | Jayaratne et al. | |
| 7,294,599 B2 | 11/2007 | Jensen et al. | |
| 7,312,283 B2 | 12/2007 | Martin et al. | |
| 7,601,665 B2 | 10/2009 | McDaniel et al. | |
| 7,884,163 B2 | 2/2011 | McDaniel et al. | |
| 8,049,052 B2 | 11/2011 | Kreischer et al. | |
| 8,309,483 B2 | 11/2012 | Saito et al. | |
| 8,372,771 B2 | 2/2013 | Benham et al. | |
| 8,623,973 B1 | 1/2014 | McDaniel et al. | |
| 8,703,886 B1 | 4/2014 | Yang et al. | |
| 8,916,647 B2 | 12/2014 | Zuercher et al. | |
| 9,023,959 B2 | 5/2015 | McDaniel et al. | |
| 9,023,967 B2 | 5/2015 | Yu et al. | |
| 9,068,034 B2 | 6/2015 | Squire et al. | |
| 9,598,513 B2 | 3/2017 | Yu et al. | |
| 9,783,661 B2* | 10/2017 | Dou | C08L 23/06 |
| 2009/0283939 A1* | 11/2009 | Turner | C08L 23/04 |
| | | | 264/500 |
| 2010/0190926 A1 | 7/2010 | Krishnaswamy et al. | |
| 2010/0280206 A1* | 11/2010 | Follestad | C08F 210/02 |
| | | | 526/336 |
| 2011/0034635 A1* | 2/2011 | Kapur | C08F 10/00 |
| | | | 525/240 |
| 2013/0017745 A1* | 1/2013 | Oswald | C08L 23/0815 |
| | | | 442/62 |
| 2013/0319131 A1 | 12/2013 | Inn et al. | |
| 2014/0100325 A1* | 4/2014 | Burton | C08F 210/18 |
| | | | 524/554 |
| 2015/0025195 A1* | 1/2015 | Cottle | C08L 23/06 |
| | | | 525/52 |
| 2016/0115255 A1 | 4/2016 | Cruz et al. | |

OTHER PUBLICATIONS

Cardin, D. J., et al., "Chemistry of Organo-Zirconium and -Hafnium Compounds," 1986, 5 pages of cover, publishing information, and contents, Halstead Press: a division of John Wiley & Sons, New York.

Hieber, C. A., et al., "Shear-Rate-Dependence Modeling of Polymer Melt Viscosity," Jul. 1992, pp. 931-938, vol. 32, No. 14, Polymer Engineering and Science.

Hieber, C. A., et al., "Some correlations involving the shear viscosity of polystyrene melts," 1989, pp. 321-332, vol. 28, No. 4, Rheologica Acta.

Janzen, J., et al., "Diagnosing long-chain branching in polyethylenes," Journal of Molecular Structure, 1999, pp. 569-584 plus comments and information pages, vol. 485-486, Elsevier Science B.V.

Kajigaeshi, Shoji, et al., "Selective Preparation of Fluorene Derivatives Using the t-Butyl Function as a Positional Protective Group," Bull. Chem. Soc. Jpn., Jan. 1986, pp. 97-103, vol. 59, No. 1, The Chemical Society of Japan.

Köppl, Alexander, et al., "Heterogeneous metallocene catalysts for ethlene polymerization," Journal of Molecular Catalysis A: Chemical, 2001, pp. 23-32, vol. 165, Elsevier Science B.V.

McNaught, Alan D., et al., "Compendium of Chemical Terminology," IUPAC Recommendations, Second edition, 1997, 5 pages, Wiley-Blackwell.

Wailes, P. C., et al., "Organometallic Chemistry of Titanium, Zirconium, and Hafnium," 1974, 6 pages of cover, publishing information, and contents, Academic Press, New York.

Yu, Youlu, et al., "SEC-MALS Method for the Determination of Long-Chain Branching and Long-Chain Branching Distribution in Polyethylene," Polymer, 2005, pp. 5165-5182, vol. 46, Elsevier Ltd.

\* cited by examiner

BIMODAL PE RESINS WITH IMPROVED MELT STRENGTH

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to polymers, and methods of making and using same; more specifically, the present disclosure relates to polymers having improved processability; still more specifically, the present disclosure relates to polymers with improved melt strength.

BACKGROUND

Polymers, such as polyethylene homopolymers and copolymers, are used for the production of a wide variety of articles. The use of a particular polymer in a particular application will depend on the type of physical and/or mechanical properties displayed by the polymer. Thus, there is an ongoing need to develop polymers that display desired physical and/or mechanical properties and improved methods for producing these polymers.

BRIEF SUMMARY

Disclosed herein is a method comprising introducing a polymerization feed comprising an α-olefin, a diluent, and a diene to a polymerization system, under polymerization conditions, whereby a polymer product is produced, wherein the diene is present at a level in the range of from about 1 ppm to about 1000 ppm based on the diluent.

Also disclosed herein is a method comprising enhancing the long chain branching (LCB) of a polymer produced in a dual loop slurry reactor process by introducing a diene during production of the polymer.

Also disclosed herein is a method comprising enhancing the long chain branching (LCB) of a polymer produced from a Ziegler-Natta catalyst by introducing a diene during production of the polymer.

DETAILED DESCRIPTION

Figure 1A:
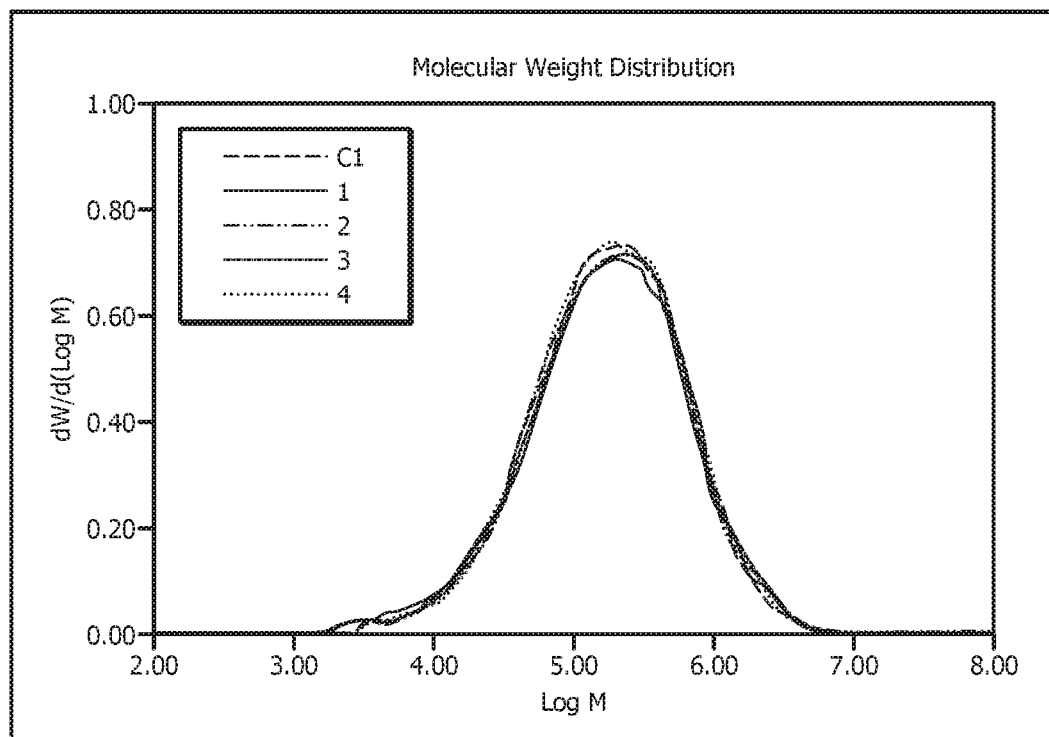
FIG. 1A is a plot of the molecular weight distribution profile of the high molecular weight, low density, Ziegler-Natta PE PIMS samples from Example 1A.

Disclosed herein are polymers with improved melt strength (hereinafter, 'PIMS'), and methods of making and using same. In embodiments, the herein-disclosed PIMS exhibits desirable rheological characteristics and processability. Without wishing to be limited by theory, such desirable rheological characteristics (e.g., enhanced shear properties) and processability of the PIMS may be the result of increased long chain branching of the PIMS provided via the incorporation of small amounts (e.g., less than about 1000 ppm) of diene(s) during production thereof, relative to a polymer produced in the same manner but absent the incorporation of the diene(s).

A challenge with the utilization of resins in durable applications, such as blow molding, pipe, geomembrane, etc., is that the melt strength of the resin can limit application where that feature is necessary. For example, bimodal polyethylene (PE) resins are typically made using Ziegler Natta (ZN) catalysts in dual reactor configurations. In order to improve melt strength, post reactor processing of the fluff polymer is conventionally effected using peroxides during the polymer finishing to build molecular weight via cross linking of the polymer.

It has been unexpectedly discovered that the addition of small quantities of various dienes during polymerization (e.g., during polymerization of ethylene using a ZN catalyst) can effectively improve the melt strength of the polymer by creating long chain branched molecules. The application of these dienes allows for the melt strength to be built in the reactor during the polymerization process, which may obviate the use of peroxides, which can be difficult to disperse and thus ensure adequate reaction. In addition, in embodiments, the diene can be added to either reactor in a dual reactor process, which may enable the production of resins having disparate properties from conventional resins produced using peroxides or other conventional cross-linking agents to effect post-polymerization cross-linking of the polymer fluff.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed. (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the table are indicated using the numbering scheme indicated in the version of the periodic table of elements published in Chemical and Engineering News, 63(5), 27, 1985. In some instances a group of elements may be indicated using a common name assigned to the group; for example alkali earth metals (or alkali metals) for Group 1 elements, alkaline earth metals (or alkaline metals) for Group 2 elements, transition metals for Group 3-12 elements, and halogens for Group 17 elements.

A chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials have three or more hydrogen atoms, as necessary for the situation, removed from the alkane. Throughout, the disclosure that a substituent, ligand, or other chemical moiety may constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedure, unless specified otherwise or the context requires otherwise.

The term "substituted" when used to describe a group, for example, when referring to a substituted analog of a particular group, is intended to describe any non-hydrogen moiety that formally replaces a hydrogen atom in that group, and is intended to be non-limiting. A group or groups may also be referred to herein as "unsubstituted" or by equivalent terms such as "non-substituted," which refers to the original group in which a non-hydrogen moiety does not replace a hydrogen atom within that group. "Substituted" is intended to be non-limiting and include inorganic substituents or organic substituents.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. Moreover, other identifiers or qualifying terms may be utilized to indicate the presence or absence of a particular substituent, a particular regiochemistry and/or stereochemistry, or the presence or absence of a branched underlying structure or backbone.

Within this disclosure the normal rules of organic nomenclature will prevail. For instance, when referencing substituted compounds or groups, references to substitution patterns are taken to indicate that the indicated group(s) is (are) located at the indicated position and that all other non-indicated positions are hydrogen. References to compounds or groups having substitutions at positions in addition to the indicated position will be reference using comprising or some other alternative language.

Embodiments disclosed herein the may provide the materials listed as suitable for satisfying a particular feature of the embodiment delimited by the term 'or.' For example, a particular feature of the disclosed subject matter may be disclosed as follows: Feature X can be A, B, or C. It is also contemplated that for each feature the statement can also be phrased as a listing of alternatives such that the statement 'Feature X is A, alternatively B, or alternatively C' is also an embodiment of the present disclosure whether or not the statement is explicitly recited.

Herein disclosed is a method of producing a polymer having improved melt strength (PIMS). The method comprises polymerizing a monomer in the presence of a diene, to produce a PIMS product. The polymerization is effected in a polymerization system and under polymerization conditions, as described hereinbelow or under suitable conditions known to one of skill in the art.

In embodiments, the diene is present as free monomer in a polymerization reaction medium (e.g., within a polymerization reactor system) at a level in the range of from about 1 ppm to about 1000 ppm, from about 5 ppm to about 500 ppm, or from about 10 to about 20 ppm; or less than or equal to about 20 ppm, 15 ppm, 10 ppm, 9 ppm, 8 ppm, 7 ppm, 6 ppm, 5 ppm, 4 ppm, 3 ppm, 2 ppm, or 1 ppm, based on the diluent. In embodiments, the aforementioned level of diene is present in a polymerization feed to a polymerization reactor. In embodiments, the aforementioned level of diene is present in the internal contents of a polymerization reactor. In embodiments, the polymerization system comprises first and second polymerization zones or reactors in series, and the diene is introduced at the aforementioned levels into a polymerization feed to the first polymerization zone or reactor, a polymerization feed to the second polymerization zone or reactor, or both a polymerization feed to the first polymerization zone or reactor and a polymerization feed to the second polymerization zone or reactor. In embodiments, the polymerization system comprises first and second polymerization zones or reactors in series, and the diene is present at the aforementioned levels within the first polymerization zone or reactor, within the second polymerization zone or reactor, or both within the first polymerization zone or reactor and the second polymerization zone or reactor. Furthermore, as used herein, the term comonomer is intended to refer to a monomer other than a diene, and thus a PIMS having a comonomer would include, for example, polyethylene having hexene as a comonomer and further comprising diene as described herein.

In embodiments, the diene is selected from dienes having a boiling point of less than or equal to about 110° C., 100° C., or 90° C.

In embodiments, the diene is selected from conjugated dienes. In embodiments, the diene is a conjugated diene selected from 1,3-hexadiene, 2,4-hexadiene, 1,3-pentadiene, 1,3-butadiene, 2-methyl-1,3-butadiene (isoprene), 4-methyl-1,3-pentadiene, 1,3-cyclopentadiene, or combinations thereof.

In embodiments, the diene is selected from non-conjugated dienes. In embodiments, the diene is selected from C6-C15 straight chain hydrocarbon non-conjugated dienes. In embodiments, the diene is selected from C6-C15 branched chain hydrocarbon non-conjugated dienes. In embodiments, the diene is selected from C6-C15 cyclic hydrocarbon non-conjugated dienes. In embodiments, the non-conjugated diene is selected from straight chain acyclic dienes. Such straight chain acyclic dienes include, without limitation, 1,5-heptadiene; 1,4-pentadiene; 1,6-heptadiene; 1,7-octadiene; 1,4-hexadiene; and 1,9-decadiene. In embodiments, the non-conjugated diene is selected from branched chain acyclic dienes. Such branched chain acyclic dienes, include, without limitation, 5-methyl-1,4-hexadiene; 2-methyl-1,5-hexadiene; 6-methyl-1,5-heptadiene; 7-methyl-1,6-octadiene; 3,7-dimethyl-1,6-octadiene; 3,7-dimethyl-1,7-octadiene; 5,7-dimethyl-1,7-octadiene; and mixed isomers of dihydromyrcene. In embodiments, the non-conjugated diene is selected from single ring alicyclic dienes. Such single ring alicyclic dienes include, without limitation, 1,4-cyclohexadiene, 1,5-cyclooctadiene and 1,5-cyclododecadiene. In embodiments, the non-conjugated diene is selected from multi-ring alicyclic fused and bridged ring dienes. Such multi-ring alicyclic fused and bridged ring dienes include, without limitation, dicyclopentadiene, tetrahydroindene, methyl tetrahydroindene; alkenyl, alkylidene, cycloalkenyl and cycloalkylidene norbornenes, including 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene and 5-cyclohexylidene-2-norbornene.

In embodiments, the diene is selected from 1,5-hexadiene, 1,3-butadiene, isoprene, or combinations thereof. In embodiments, the diene is selected from 1,5-hexadiene, 1,3-butadiene, isoprene, 1,4-pentadiene, 1,6-heptadiene, 1,7-octadiene, 1,4-hexadiene, 1,9-decadiene, or combinations thereof.

In embodiments, the PIMS disclosed herein are linear olefin, or alpha-olefin polymers. Herein, the polymer refers both to a material collected as the product of a polymerization reaction (e.g., a reactor or virgin resin, base resin, or 'fluff') and a polymeric composition comprising a polymer and one or more additives. In embodiments, a monomer (e.g., ethylene) is polymerized in the presence of a diene(s) using the methodologies disclosed herein to produce a PIMS of the type disclosed herein. The PIMS may comprise a homopolymer. It is to be understood that some amount of comonomer may be present in the PIMS disclosed herein and the polymer still be considered a homopolymer. For example a comonomer can be present in an amount of less than about 0.5 wt. %, 0.25 wt. %, or 0.1 wt. % based on the total weight of polymer, and the PIMS will still be referred to herein as a homopolymer.

In an alternative embodiment, the polymer is a copolymer. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In embodiments, the PIMS is a polymer of ethylene, e.g., polyethylene (PE), alternatively a copolymer of ethylene and 1-hexene.

In embodiments, a PIMS of the type described herein may be prepared by any suitable polymerization method, for example by employing one or more catalyst systems, in one or more reactors or polymerization zones, in solution, in slurry, or in the gas phase, as described hereinbelow.

The PIMS of the present disclosure can be produced using various types of polymerization reactors, as known to those of skill in the art. For example, the polymerization system can comprise one or more reactors selected from loop slurry reactors, fluidized bed gas phase reactors, multi-zone reactors, batch reactors, and CSTR reactors. In embodiments, the method comprises enhancing the long chain branching (LCB) of a polymer produced in a multi-reactor process by introducing a diene during production of the polymer. By way of non-limiting example, in embodiments, the multi-reactor system comprises dual loop slurry reactors as described hereinbelow.

As used herein, "polymerization reactor" includes any reactor capable of polymerizing olefin monomers (e.g., ethylene) to produce homopolymers and/or copolymers (e.g., PE homopolymers and/or copolymers). Homopolymers and/or copolymers produced in the reactor may be referred to as resin and/or polymers. The various types of reactors include, but are not limited to, those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diene(s), diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In embodiments, any arrangement and/or any combination of reactors may be employed to produce the polymer of the present disclosure.

According to one embodiment, the polymerization reactor system may comprise at least one loop slurry reactor. Such reactors may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction;

separation by cyclonic action in either a cyclone or hydrocyclone; separation by centrifugation; or other appropriate method of separation.

Suitable slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In embodiments, a PIMS of the type described herein is utilized to produce a physical or mechanical polymer blend, e.g., a blend of two or more component polymers such as a higher molecular weight (HMW) component and a lower molecular weight (LMW) component. For example, a PIMS of this disclosure may be a first component (e.g., a polymer product comprising a diene as described herein) subsequently blended with another independently produced component (e.g., another polymer product that does not comprise a diene), providing a physical blend (also referred to herein as a 'PIMS blend') of the first (i.e., the PIMS component) and second component.

In embodiments the herein-disclosed PIMS production method comprises polymerization of an alpha-olefin monomer and a diene of the type disclosed herein in the presence of at least two different catalytic materials or catalysts, for example a catalyst system comprising at least two transition metal complexes. For example, the catalyst system may comprise a first and a second transition metal complex, wherein the first and second transition metal complexes are different. In embodiments, the catalyst system comprises at least two metallocene complexes and results in the simultaneous formation of the two components of the PIMS resin when both catalysts are employed in a single reactor. In the alternative, a first catalyst system (e.g., comprising a first metallocene complex) may be associated with a first reactor. Alpha-olefin monomer (and optionally the diene) may be contacted with the first catalyst system and reactor and conditions adjusted such that polymerization of the alpha-olefin monomer results and a first component of the PIMS resin is produced. The first component may then be contacted with a second catalyst system and alpha-olefin monomer (and additionally or alternatively, the diene) under conditions to result in the polymerization of the alpha-olefin monomer and formation of the second component of the PIMS resin. In such embodiments, the components of the PIMS resin are produced sequentially, wherein at least one of the components comprises a diene as disclosed herein. In embodiments, the first and second catalyst systems are the same. In the aforementioned embodiments, the PIMS formed may be considered to be a reactor blend of the two components.

In embodiments, the polymerization system comprises first and second polymerization zones in series, and one or more dienes are introduced into the first polymerization zone, the second polymerization zone, or into both the first polymerization zone and the second polymerization zone. In embodiments, the first polymerization zone comprises a first polymerization reactor, and the second polymerization zone comprises a second polymerization reactor. In embodiments, the first and second polymerization zones in series comprise dual loop slurry reactors in series.

In embodiments, the PIMS comprises a multimodal (e.g., PE) resin comprising a diene as described herein. Herein, the "modality" of a polymer resin refers to the form of its molecular weight distribution curve, i.e., the appearance of the graph of the polymer weight fraction, frequency, or number, as a function of its molecular weight, as may be determined by, for example, by gel permeation chromatography (GPC). The polymer weight fraction refers to the weight fraction of molecules of a given size. A polymer having a molecular weight distribution curve showing a single peak may be referred to as a unimodal polymer, a polymer having curve showing two distinct peaks may be referred to as a bimodal or a bimodal-like polymer, a polymer having a curve showing three distinct peaks may be referred to as a trimodal polymer, etc. Polymers having molecular weight distribution curves showing more than one peak may be collectively referred to as multimodal polymers or resins. It is acknowledged that, in some instances, a multimodal polymer may appear to have a single peak via, for example, GPC analysis, when in fact the polymer itself is multimodal. In such instances, overlap of peaks may obscure the presence of other peaks and may imply unimodality, when in fact multimodality is a more accurate representation of the nature of the polymer or polymers. In embodiments, the PIMS comprises a resin having a HMW component and a LMW component, wherein one or both of the components comprise a diene as described herein.

In embodiments, the PIMS resin is a metallocene- or Ziegler-Natta-catalyzed, multimodal (e.g., bimodal) polyethylene copolymer with 1-hexene and a diene as described herein. In embodiments, the PIMS resin is a dual-metallocene- or ZN-catalyzed, multimodal (e.g., bimodal) polyethylene copolymer comprising a diene as described herein. As noted hereinabove, examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an aspect, the comonomer is 1-hexene.

A polymer resin may have two or more components that may be distinguishable from one another, for example based upon their individual composition and/or molecular weight distribution. A molecular weight distribution curve may be prepared for each individual component of the polymer resin. For example, the molecular weight distribution curve for the individual components of the polymer resin may display a single peak and thus be unimodal. The molecular weight distribution curves for the individual components may be superimposed onto a common chart to form the weight distribution curve for the polymer resin as a whole. Upon such superimposition, the resultant curve for the polymer resin as a whole may be multimodal or show n distinct peaks corresponding to n polymer components of differing molecular weight distributions. For example, a bimodal polymer resin may show two distinct peaks corresponding to two individual components. For example, a bimodal polymer resin may have a first component that may be generally characterized as a higher molecular weight polymer component and a second component that may be generally characterized as a lower molecular weight polymer component. A trimodal polymer composition may show three distinct peaks corresponding to three individual polymer components. Alternatively, superimposition of the molecular weight distribution curves from the individual components may show a single peak that is broadened in comparison with the curves for the individual components corresponding to polymer fractions having different but overlapping molecular weight distributions. Such compositions while appearing unimodal may be deconvoluted into their individual component peaks and can thus be shown to be a multimodal composition.

In embodiments, the PIMS comprises a copolymer comprised of a polymer of ethylene with one or more comonomers such as alpha olefins and a diene as disclosed herein. In embodiments, the PIMS resin comprises a higher molecular weight (HMW) component and a lower molecular weight (LMW) component, for example a HMW copolymer component (e.g., a copolymer of ethylene and 1-hexene and optionally a diene) and a LMW copolymer component (e.g., a copolymer of ethylene and 1-hexene and additionally or alternatively, a diene). In embodiments, the PIMS resin is a dual-metallocene or ZN polyethylene having a HMW component comprised of polyethylene copolymer with 1-hexene and optionally a diene and a LMW component comprised of polyethylene copolymer with 1-hexene and additionally or alternatively, a diene.

In embodiments, the PIMS comprises a bimodal PE copolymer having a high molecular weight (HMW) component and a low molecular weight component (LMW), and the method further comprises adding the diene to a first polymerization zone in which the HMW component is produced, introducing the diene into a second polymerization zone in which the LMW component is produced, or introducing the diene into both the first and second polymerization zones. The first polymerization zone may be upstream or downstream of the second polymerization zone.

That is, the HMW component of the PIMS can be produced in an upstream or downstream polymerization zone or reactor. Likewise, the LMW component of the PIMS can be produced in an upstream or downstream polymerization zone or reactor. The diene can be introduced or fed into the upstream polymerization zone or reactor (in which either the HMW (low density) component, or the LMW (high density) component of the PIMS is formed), the downstream polymerization zone or reactor (in which the other component of a bimodal PIMS is formed), or both. In this manner, the diene can be targeted to the LMW component, the HMW component, or both.

In embodiments, the PIMS production method of this disclosure further comprises altering at least one property of the PIMS product by adjusting the amount of the diene, the type of the diene, or both the amount and the type of the diene, introduced into the first polymerization zone, the second polymerization zone, or both the first polymerization zone and the second polymerization zone. The at least one property may comprise any property delineated hereinbelow. In embodiments, the at least one property altered via diene addition is the melt strength, the impact strength, the crossover modulus, or a combination thereof.

It is to be understood that in the case of polymer blends (e.g., physical or reactor blends) the individual components of the blend may be described approximately herein. Thus, any metrics or characteristics provided herein for the individual components of a polymer blend are approximated for that portion of the material corresponding to the designated component and are provided as values for some portion of the material within the larger context of the entire blend. Thus where it is not possible to measure the characteristics of an individual component (e.g., reactor blend) such characteristics when represented herein may contain some contribution from other components of the blend.

In embodiments, a method of preparing a polymer (i.e., PIMS) comprises contacting an olefin (e.g., ethylene) monomer with a catalyst system under conditions suitable for the formation of a polymer of the type described herein (i.e., PIMS). In embodiments, the catalyst system comprises a transition-metal complex. The terms "catalyst composition," "catalyst mixture," "catalyst system," and the like, do not depend upon the actual product resulting from the contact or reaction of the components of the mixtures, the nature of the active catalytic site, or the fate of the co-catalyst, the catalyst, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In embodiments, a catalyst system suitable for the preparation of a polymer (i.e., PIMS) comprises a metallocene-containing catalyst. Nonlimiting examples of metallocene-containing catalysts suitable for use in this disclosure are described in more detail in U.S. Pat. Nos. 4,939,217; 5,191,132; 5,210,352; 5,347,026; 5,399,636; 5,401,817; 5,420,320; 5,436,305; 5,451,649; 5,496,781; 5,498,581; 5,541,272; 5,554,795; 5,563,284; 5,565,592; 5,571,880; 5,594,078; 5,631,203; 5,631,335; 5,654,454; 5,668,230; 5,705,478; 5,705,579; 6,187,880; 6,509,427; 7,026,494, and U.S. Patent App. No. 20100190926 A1, each of which is hereby incorporated herein by reference in its entirety for all purposes not contrary to this disclosure. Other processes to prepare metallocene compounds suitable for use in this disclosure have been reported in references such as: Koppl, A. Alt, H. G. J. Mol. Catal. A. 2001, 165, 23; Kajigaeshi, S.; Kadowaki, T.; Nishida, A.; Fujisaki, S. The Chemical Society of Japan, 1986, 59, 97; Alt, H. G.; Jung, M.; Kehr, G. J. Organomet. Chem. 1998, 562, 153-181; and Alt, H. G.; Jung, M. J. Organomet. Chem. 1998, 568, 87-112; each of which is hereby incorporated herein by reference in its entirety for all purposes not contrary to this disclosure. The following treatises also describe such methods: Wailes, P. C.; Coutts, R. S. P.; Weigold, H. in Organometallic Chemistry of Titanium, Zirconium, and Hafnium, Academic; New York, 1974; Cardin, D. J.; Lappert, M. F.; and Raston, C. L.; Chemistry of Organo-Zirconium and -Hafnium Compounds; Halstead Press; New York, 1986.

In embodiments, the catalyst system for preparation of the PIMS resin comprises at least two metallocene complexes. Herein, the term "metallocene" describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. The metallocenes may be combined with a solid activator, an aluminum alkyl compound, an olefin monomer, and an olefin comonomer to produce the desired bimodal polyolefin. The activity and the productivity of the catalyst may be relatively high. As used herein, the activity refers to the grams of polymer produced per gram of solid catalyst charged per hour, and the productivity refers to the grams of polymer produced per gram of solid catalyst charged. Examples of such catalyst systems are disclosed in U.S. patent application Ser. No. 11/209,006, filed Aug. 22, 2005 and entitled "Polymerization Catalysts And Process For Producing Bimodal Polymers In A Single Reactor," and U.S. patent application Ser. No. 11/208,077, filed Aug. 19, 2005 and entitled "Polymerization Catalysts and Process for Producing Bimodal Polymers in a Single Reactor," each of which is hereby incorporated herein in its entirety for all purposes not contrary to this disclosure.

In embodiments, the PIMS is a bimodal PE resin produced via a catalyst system comprising at least two metallocene complexes (e.g., via a dual-metallocene catalyst).

In embodiments, a catalyst system suitable for the preparation of a PIMS of this disclosure comprises a Ziegler-Natta catalyst. Nonlimiting examples of Ziegler-Natta catalysts suitable for use in this disclosure are described in more detail in U.S. Pat. Nos. 6,174,971 and 6,486,274, each of which is hereby incorporated herein by reference in its entirety for all purposes not contrary to this disclosure.

In embodiments, the PIMS is a bimodal PE resin produced via a catalyst system comprising Ziegler-Natta catalyst.

In embodiments, a catalyst system suitable for the preparation of a PIMS of this disclosure comprises a chromium-based catalyst. Nonlimiting examples of chromium-based catalysts suitable for use in this disclosure are described in more detail in U.S. Pat. Nos. 8,049,052, 8,372,771, and 9,023,967, and U.S. patent application Ser. No. 14/676,581, each of which is hereby incorporated herein by reference in its entirety for all purposes not contrary to this disclosure. Chromium catalysts are used throughout the world for the polymerization of polyethylene. Catalyst manufacturers prepare the catalysts, often by placing the chromium on a solid support, such as alumina, silica, aluminophosphate, silica-alumina, silica-titania, silica-zirconia, clay, etc. The support helps to stabilize the activity of the chromium and allows the catalyst to be shipped in an inactive form to the purchaser. Once the catalyst arrives at a polymer manufacturing site, it must be activated for use in the polymerization process. Typically, chromium catalysts are activated by calcining or heating large quantities of the catalyst in dry air, in some type of activation apparatus of vessel such as a fluidized bed activator. The following references are incorporated as examples of chromium catalysts that are suitable for use in the present disclosure: U.S. Pat. Nos. 3,887,494, 3,119,569, 4,081,407, 4,152,503, 4,053,436, 4,981,831, 4,364,842, 4,444,965, 4,364,855, 4,504,638, 3,900,457, 4,294,724, 4,382,022, 4,151,122, 4,247,421, 4,248,735, 4,277,587, 4,177,162, 4,735,931, 4,820,785, and 4,966,951, the disclosure of each of which is hereby incorporated herein in its reference for all purposes not contrary to this disclosure.

The PIMS may comprise additives. Examples of additives include, but are not limited to, antistatic agents, colorants, stabilizers, nucleators, surface modifiers, pigments, slip agents, antiblocks, tackifiers, polymer processing aids, and combinations thereof. In embodiments, the polymeric composition comprises carbon black. Such additives may be used singularly or in combination and may be included in the polymer composition before, during, or after preparation of the PIMS resin as described herein. Such additives may be added via any suitable technique, for example during an extrusion or compounding step such as during pelletization or subsequent processing into an end use article. Such additives may be added to the polymer before, during, and/or after a reactive extrusion process (e.g., additives may be added to the PIMS polymer fluff before reactive extrusion, additives may be added to the PIMS during reactive extrusion, additives may be added to the resultant PIMS product of a reactive extrusion, or a combination thereof).

As noted hereinabove, the herein-disclosed polymer (i.e., the PIMS) has an enhanced melt strength relative to a polymer product produced via the same method but absent the presence of the diene. A PIMS of this disclosure may be further described by reference to one or more parameters such as density, molecular weight, molecular weight distribution, modality, melt index (MI), high load melt index (HLMI), Carreau-Yasuda "a" parameter, zero shear viscosity, relaxation time, degree of long chain branching, and degree of unsaturation, which are described further hereinbelow. While each of these parameters is described generally, it is understood that each such parameter and combinations thereof is applicable to any particular PIMS of the type disclosed herein such as, by way of non-limiting examples, polyolefin homopolymers (e.g., polyethylene homopolymers, polyalphaolefins (PAO)), copolymers (e.g., copolymers of ethylene and propene, 1-butene, 1-pentene, 1-hexene, 1-heptene, 1-octene, etc.).

A ZN ADL PIMS, as referred to below, is a Ziegler-Natty catalyzed PE PIMS produced using an Advanced Dual Loop polyethylene reactor system comprising two loop slurry reactors in series. Via such an ADL, bimodal resins are formed by polymerizing ethylene in the first reactor, transferring the contents to the second reactor, and continuing the polymerization with the introduction of additional ethylene.

In embodiments, a PIMS of the type described herein is characterized by a density of from about 0.915 g/mL to about 0.975 g/mL, alternatively from about 0.925 g/mL to about 0.975 g/mL, or alternatively from about 0.950 g/mL to about 0.975 g/mL, as determined in accordance with ASTM D1505. In embodiments, a ZN ADL PIMS of the type described herein is characterized by a density of from about 0.946 g/mL to about 0.952 g/mL, alternatively from about 0.946 g/mL to about 0.951 g/mL, or alternatively from about 0.947 g/mL to about 0.949 g/mL, as determined in accordance with ASTM D1505.

In embodiments, a PIMS of the type described herein may be characterized by a weight average molecular weight ($M_w$) of less than about 100,000 g/mol, alternatively from about 350 g/mol to about 50,000 g/mol, alternatively from about 1,000 g/mol to about 40,000 g/mol; alternatively from about 10,000 g/mol to about 40,000 g/mol; or alternatively from about 25,000 g/mol to about 40,000 g/mol; a number average molecular weight ($M_n$) of from about 100 g/mol to about 40,000 g/mol, alternatively from about 5000 g/mol to about 40,000 g/mol; alternatively from about 100 g/mol to about 20,000 g/mol; alternatively from about 100 g/mol to about 16,000 g/mol; or alternatively from about 500 g/mol to about 16,000 g/mol; alternatively from about 1,250 g/mol to about 16,000 g/mol; and a z-average molecular weight ($M_z$) of from about 1,400 g/mol to about 1,5000,000 g/mol, alternatively from about 400,000 g/mol to about 1,500,000 g/mol, alternatively from about 1,400 g/mol to about 750,000 g/mol; alternatively from about 4,000 g/mol to about 600,000 g/mol; alternatively from about 40,000 g/mol to about 600,000 g/mol; or alternatively from about 100,000 g/mol to about 600,000 g/mol. The weight average molecular weight $M_w$ describes the size average of a polymer composition and can be calculated according to Equation 1:

$$M_w = \frac{\sum_i N_i M_i^2}{\sum_i N_i M_i} \quad (1)$$

wherein $N_i$ is the number of molecules of molecular weight $M_i$. All molecular weight averages are expressed in gram per mole (g/mol).

The number average molecular weight $M_n$ is the common average of the molecular weights of the individual polymers calculated by measuring the molecular weight $M_i$ of $N_i$ polymer molecules, summing the weights, and dividing by the total number of polymer molecules, according to Equation 2:

$$M_n = \frac{\sum_i N_i M_i}{\sum_i N_i} \quad (2)$$

The $M_z$ is a higher order molecular weight average which is calculated according to Equation 3:

$$M_z = \frac{\sum_i N_i M_i^3}{\sum_i N_i M_i^2} \quad (3)$$

wherein $N_i$ is the number of molecules of molecular weight $M_i$.

The molecular weight distribution (MWD) of the PIMS may be characterized by the ratio of the $M_w$ to the $M_n$, which is also referred to as the polydispersity index (PDI) or more simply as polydispersity. A PIMS of the type disclosed herein may have a PDI from about 1 to about 50, alternatively from about 2 to about 10, alternatively from about 2 to about 5, or alternatively from about 2 to about 4.

The ratio of $M_z$ to the $M_w$ is another indication of the breadth of the MWD of a polymer. A PIMS of the type described herein may be further characterized by a ratio ($M_z/M_w$) of from about 1.3 to about 15, alternatively from about 1.5 to about 12, or alternatively from about 2 to about 10.

In embodiments, the individual components of the PIMS resin or of a mechanical blend of a PIMS as described herein with another component (e.g., the LMW component and the HMW component) have narrow molecular weight distributions (MWD). More specifically, the HMW component may have a PDI of from about 2 to about 5, alternatively from about 2 to about 4, or alternatively from about 2 to about 3. The LMW component may have a PDI of from about 2 to about 5, alternatively from about 2 to about 4, or alternatively from about 2 to about 3. The resultant PIMS resin (i.e., including both the LMW and HMW components) may have a broad MWD of from about 5 to about 30, alternatively from about 5 to about 20, or alternatively from about 5 to about 10.

As discussed hereinabove, a PIMS of the type described herein may be a multimodal polymer. In embodiments, the PIMS is characterized as a bimodal polymer. Such a bimodal PIMS may display two distinct peaks attributable to a higher molecular weight (HMW) component and a lower molecular weight (LMW) component.

In embodiments, the PIMS is a bimodal (e.g., polyethylene) resin comprising a high molecular weight (HMW) component and a low molecular weight (LMW) component, wherein the HMW component has a higher weight average molecular weight $M_w$ than the LMW component. In embodiments, the LMW component is present in the PIMS in a weight fraction of from about 0.3 to about 0.7, alternatively from about 0.4 to about 0.7, or alternatively from about 0.5 to about 0.65 based on total weight of the PIMS. In embodiments, the LMW component has a weight average molecular weight ($M_w$) ranging from about 350 g/mol to about 75,000 g/mol, from about 1,000 g/mol to about 40,000 g/mol, from about 10,000 g/mol to about 40,000 g/mol, or from about 25,000 g/mol to about 40,000 g/mol and is present in the PIMS resin in an amount of from about 0 weight percent (wt. %) to less than about 100 wt. %, from about 50 wt. % to about 100 wt. %, or from about 75% to about 100 wt. %, based on the total polymer weight. In embodiments, the HMW component has a $M_w$ ranging from about 50,000 g/mol to about 1,000,000 g/mol, from about 50,000 g/mol to about 100,000 g/mol, or from about 75,000 g/mol to about 100,000 g/mol and is present in the PIMS resin in an amount of from greater than about 0 wt. % to less than about 100 wt. %, from about 25 wt. % to about 100 wt. %, or from about 50 wt. % to about 100 wt. %, based on the total polymer weight.

In embodiments, a ZN ADL PIMS resin of the type described herein may be characterized by a melt index, MI, in the range of from about 0.01 to about 0.1 dg/min, alternatively in the range of from about 0.01 to about 0.08 dg/min, or alternatively in the range of from about 0.02 to about 0.06 dg/min. In embodiments, a metallocene PIMS resin of the type described herein may be characterized by a melt index, MI, in the range of from about 0.2 to about 2.0 dg/min, alternatively in the range of from about 0.3 to about 1.5 dg/min, or alternatively in the range of from about 0.4 to about 1.0 dg/min. The melt index (MI) refers to the amount of a polymer which can be forced through an extrusion rheometer orifice of 0.0825 inch diameter when subjected to a force of 2,160 grams in ten minutes at 190° C., as determined in accordance with ASTM D1238.

In embodiments, a ZN ADL PIMS resin of the type described herein may be characterized by a high load melt index, HLMI, in the range of from about 3 to about 15 dg/min, alternatively in the range of from about 5 dg/min to about 10 dg/min, or alternatively from about 6 dg/min to about 8 dg/min. In embodiments, a metallocene PIMS resin of the type described herein may be characterized by a high load melt index, HLMI, in the range of from about 10 to about 50 dg/min, alternatively in the range of from about 15 dg/min to about 40 dg/min, or alternatively from about 15 dg/min to about 25 dg/min. The HLMI represents the rate of flow of a molten polymer through an orifice of 0.0825 inch diameter when subjected to a force of 21,600 grams at 190° C. as determined in accordance with ASTM D1238.

In embodiments, a ZN ADL PIMS resin of the type described herein may be characterized by a shear response in the range of from about 200 to about 800, alternatively from about 200 to about 600, or alternatively from about 200 to about 400. In embodiments, a metallocene PIMS resin of the type described herein may be characterized by a shear response in the range of from about 10 to about 60, alternatively from about 15 to about 50, or alternatively from about 15 to about 40. The shear response refers to the ratio of high load melt index to melt index (HLMI/MI).

The Carreau-Yasuda 'a' parameter (CY-a) is defined as the rheological breadth parameter. Rheological breadth refers to the breadth of the transition region between Newtonian and power-law type shear rate for a polymer or the frequency dependence of the viscosity of the polymer. The rheological breadth is a function of the relaxation time distribution of a polymer, which in turn is a function of the polymer molecular structure or architecture. The CY-a parameter may be obtained by assuming the Cox-Merz rule and calculated by fitting flow curves generated in linear-viscoelastic dynamic oscillatory frequency sweep experiments with a modified Carreau-Yasuda (CY) model, which is represented by Equation 4:

$$|\eta^*(\omega)| = \eta_o[1 + (\tau_\eta \omega)^a]^{\frac{n-1}{a}} \quad (4)$$

where $|\eta^*(\omega)|$=magnitude of the complex shear viscosity (Pa·s)
$\eta_o$=zero shear viscosity (Pa·s) [defines the Newtonian plateau]
$\omega$=angular frequency of oscillatory shear deformation (i.e., shear rate (1/s))
$\alpha$=rheological breadth parameter
$\tau_\eta$=viscous relaxation time (s) [describes the location in time of the transition region]
n=power law constant [defines the final slope of the high shear rate region].

To facilitate model fitting, the power law constant n is held at a constant value (i.e., 0.1818). The dynamic shear viscosities may be measured experimentally, and the data may be fit to the CY Equation 4 to determine $\eta_o$ values and other rheological parameters. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is hereby incorporated herein by reference in its entirety for all purposes not contrary to this disclosure.

In embodiments, a PIMS of the type described herein may be characterized by a Carreau-Yasuda 'a' parameter in the range of from about 0.005 to about 2.00, alternatively from about 0.01 to about 1.00, alternatively from about 0.05 to about 0.80, or alternatively from about 0.10 to about 0.50.

The zero shear viscosity refers to the viscosity of the polymer at a zero shear rate and is indicative of the molecular structure of the materials. Further, for polymer melts, the zero shear viscosity is often a useful indicator of processing attributes such as melt strength in blow-molding and foam technologies and bubble stability in film blowing. For example, the higher the zero shear viscosity, the better the melt strength or bubble stability. In embodiments, the PIMS product has a zero shear viscosity $\eta_o$ that is greater than that of a polymer product produced via the same method but absent the presence of the diene. In embodiments, a PIMS of the type described herein may be characterized by a zero shear viscosity $(\eta_o)$, defined by Equation 4, in the range of from about 1.0E+04 Pa-s to about 1.0E+08 Pa-s, alternatively from about 1.0E+00 Pa-s to about 1.0E+06 Pa-s, or alternatively from about 1.0E+00 Pa-s to about 1.0E+03 Pa-s.

In embodiments, a PIMS of the type described herein has a relaxation time $(\tau_\eta)$, defined by Equation (4), in the range of from about 1.0E-03 s to about 1.0E+08 s, alternatively, from about 1.0E-02 s to about 1.2E+04 s, or alternatively, from about 1.0E-02 s to about 1.0E+03 s. The relaxation rate refers to the viscous relaxation times of the polymer and is indicative of a distribution of relaxation times associated with the wide distribution of molecular weights.

In embodiments, a PIMS of the type described herein may be characterized as a branched polymer wherein the level of long chain branching (LCB) present in the polymer is higher than that of a polymer produced in the same manner absent the diene(s). For the purpose of this disclosure, LCB is defined as comprising chains that have a number of carbon atoms ranging from about 50 carbon atoms to about 11,000 carbon atoms, alternatively from about 100 carbon atoms to about 9,000 carbon atoms, or alternatively from about 225 carbon atoms to about 7,200 carbon atoms. Polymer chain branching may be measured using any suitable methodology such as nuclear magnetic resonance (NMR) or size-exclusion chromatography-multiangle light scattering technique (SEC-MALS). Methods for the determination of long chain branching distribution are described in more detail in *Polymer* (2005) Volume 46, Issue 14, Pages 5165-5182, which is hereby incorporated herein by reference in its entirety for all purposes not contrary to this disclosure.

In embodiments, a PIMS of the type disclosed herein has a LCB content peaking that is determined as the number of LCB per million carbon atoms which is designated λ. Herein, LCB content peaking refers to the maximum concentration of LCB as a function of molecular weight. The number of LCB per $10^6$ total carbons can be calculated using the formula 1,000,000*$M_0$*B/M, where B is the number of LCB per chain, $M_0$ is the molecular weight of the repeating unit, i.e. the methylene group, —$CH_2$—, for PE; and M is the molecular weight of a SEC slice where it is assumed that all macromolecules in the same SEC slice have the same molecular weight. B can be calculated according to the following Equation:

$$g = \frac{6}{8}\left\{\frac{1}{2}\left(\frac{2+B}{B}\right)^{1/2} \ln\left[\frac{(2+B)^{1/2} + (B)^{1/2}}{(2+B)^{1/2} - (B)^{1/2}}\right] - 1\right\} \quad (5)$$

wherein g is defined as the ratio of the mean square radius of gyration of a branched polymer to that of a linear polymer of the same molecular weight. Both of the radius of gyration and the molecular weight can be determined via SEC-MALS.

In embodiment, a PIMS of the type described herein may be characterized as a branched polymer wherein the level of LCB present in the polymer (as indicated by λ) is elevated, when compared to the level of LCB in a polymer product produced via the same method but absent the presence of the diene. In embodiments, λ is greater than about 8 LCB per million carbon atoms (LCB/$10^6$ carbons), alternatively greater than about 15 LCB/$10^6$ carbons, alternatively greater than about 20 LCB/$10^6$ carbons, or alternatively greater than about 30 LCB/$10^6$ carbons. In embodiments, a PIMS of the type disclosed herein has a LCB content peaking that is determined as the number of LCB per chain. In embodiments, for a PIMS of the type disclosed herein, B is greater than about 1.0 LCB/chain, alternatively greater than about 1.3 LCB/chain, alternatively greater than about 1.5 LCB/chain, or alternatively greater than about 2.0 LCB/chain.

In embodiments, as measured by SEC-MALS for an PIMS of the type disclosed herein, is in the range of from about 0.001 LCB/$10^3$ carbons to about 1.5 LCB/$10^3$ carbons, alternatively from about 0.01 LCB/$10^3$ carbons to about 1.0 LCB/$10^3$ carbons, alternatively from about 0.1 LCB/$10^3$ carbons to about 0.8 LCB/$10^3$ carbons, or alternatively from about 0.1 LCB/$10^3$ carbons to about 0.5 LCB/$10^3$ carbons.

A statistic commonly used to quantify LCB content is α, the fraction of the total carbons that are long-branch vertexes. A more detailed description of LCBs, α, long-branch vertexes may be found in J. Janzen and R. H. Colby, *J. Mol. Structure*, 485-6, p. 569 (1999), which is hereby incorporated herein by reference in its entirety for all purposes not contrary to this disclosure. The fraction of the total carbons that are long chain vertexes, a is defined by Equation 6:

$$\alpha = \frac{\upsilon_3}{M_W / M_0} \quad (6)$$

where $\upsilon_3$ is the number of long branch vertexes, $M_w$ is the weight average molecular weight (g/mol), and $M_0$ is the molecular weight of repeating unit (Da). For linear or mostly linear polymers, when α=0, i.e., there are no long branch vertexes present, the Arnett 3.4-power law applies. When α≠0, i.e., there are long branch vertexes present, the Arnett 3.4-power law no longer applies, and there is a positive deviation from the Arnett 3.4-power law: the higher the number of long branch vertexes present, the higher the α value, the higher the deviation. When an exceptionally high level of long-chain branching is reached, a negative deviation from the Arnett 3.4-power law occurs. In embodiments, the PIMS exhibits an LCB content, as determined by α, that is greater than that of a polymer product produced via the same method but absent the presence of the diene. In embodiments, the PIMS exhibits an α in the range of from about 0.000001 to about 0.001, from about 0.00001 to about 0.001, or from about 0.0001 to about 0.001.

In embodiments, a PIMS of the type disclosed herein may be characterized by a high degree of unsaturation when compared to Ziegler or chromium derived polyethylene resins. Without wishing to be limited by theory, generally, there are four types of olefinic groups present in sufficient concentrations in polyethylene polymers to warrant consideration, one or more of which can normally be found in any polyethylene: (i) vinyl unsaturation, R—CH=CH$_2$, which may also be referred to as terminal unsaturation; (ii) trans-vinylene unsaturation, R—CH=CH—R', which may also be referred to as transinternal unsaturation, or trans unsaturation; and (iii) cis-vinylidene unsaturation and (iv) vinylidene or pendent methylene unsaturation, RR'C=CH$_2$. Vinyl unsaturation may be expressed as the number of vinyl groups present per 1,000 carbon atoms and determined in accordance with ASTM D6248. Both cis- and trans-unsaturation may be expressed as the number of trans-vinylidene groups present per 1,000 carbon atoms and determined in accordance with ASTM D6248. Vinylidene unsaturation may be expressed as the number of cis- or trans-vinylidene groups present per 1,000 carbon atoms and determined in accordance with ASTM D3124. The total degree of unsaturation of a polymer may be calculated as follows: total unsaturation=vinyl unsaturation+cis unsaturation+trans unsaturation+vinylidene unsaturation. The total unsaturation represents the total number of unsaturated groups present per 1,000 total carbon atoms.

In embodiment, a PIMS of the type disclosed herein may be characterized by a vinyl unsaturation per 1,000 total carbon atoms of from about 0 to about 0.35, alternatively from about 0 to about 0.25, or alternatively from about 0 to about 0.15. In embodiments, a PIMS of the type disclosed herein may be characterized by a trans unsaturation of from about 0 to about 0.35, alternatively from about 0 to about 0.25, or alternatively from about 0 to about 0.15. In embodiments, a PIMS of the type disclosed herein may be characterized by a vinylidene unsaturation of from about 0 to about 0.35, alternatively from about 0 to about 0.25, or alternatively from about 0 to about 0.15. In embodiments, a PIMS of the type disclosed herein may be characterized by a total unsaturation of from about 0 to about 0.35, alternatively from about 0 to about 0.25, or alternatively from about 0 to about 0.15.

$R_g$ and $M_w$ have a power-law relationship, i.e. $R_g=K*M_w^\alpha$, where K and α are constants. The α-parameter for a linear polymer is larger than a branched polymer of same type. Under the experimental condition, the α-parameter for the linear control is ca. 0.6. The α-parameter for branched polymers is <0.6. In embodiments, for a PIMS of the type disclosed herein, at $M_w$ in the range of from about 50 kg/mol to about 250 kg/mol, when subjected to SEC-MALS analysis display an α-parameter ranging from about 0.12 to about 0.39, alternatively from about 0.15 to about 0.35, or alternatively from about 0.2 to about 0.3.

In embodiments, the virgin PIMS resin or "fluff" as recovered from the polymerization process and prior to the addition of any additives or modifiers provides desirable melt strength that no post reactor processing is utilized to enhance same. However, it is envisioned that, in embodiments, post reactor processing, as known in the art, is utilized to further enhance the melt strength of the PIMS product. In embodiments, the long chain branching (and thus the melt strength) of the virgin PIMS is further enhanced via post reactor processing known to those of skill in the art. In embodiments, the level of long chain branching in a PIMS comprises post reactor radical coupling as described in U.S. patent application Ser. No. 14/933,847 entitled, "Radically Coupled Resins and Methods of Making and Using Same," the disclosure of which is hereby incorporated herein in its entirety for all purposes not contrary to this disclosure. Thus, in embodiments, the cross-linking of the virgin PIMS is further enhanced via reactive extrusion of a mixture comprising a virgin PIMS of the type disclosed herein, along with a coupling compound, and an optional coagent.

In embodiments, the mixture subjected to reactive extrusion comprises a coupling compound. Coupling compounds suitable for use in the mixture comprise organic peroxides, azides, azo compounds, silanes, or combinations thereof.

Nonlimiting examples of organic peroxides suitable for use in this disclosure include dialkyl peroxides, dicumyl peroxide, di-t-butyl peroxide, 2,5-dimethyl-2,5-di-(t-butylperoxy) hexane (DHBP), diacyl peroxides, dilauroyl peroxide, dibenzoyl peroxide, peroxyesters, t-butyl peroxy-2-ethylhexanoate, OO-(t-butyl)-O-(2-ethylhexyl) peroxycarbonate, t-butyl peroxy-3,5,5-trimethylhexylhexanoate, t-butyl peroxy benzoate, diperoxyketals, diacyl peroxides, t-amyl peroxides, n-butyl-4,4-di-(t-butyl peroxy) valerate, and the like, or combinations thereof.

Nonlimiting examples of azides suitable for use in this disclosure include R—N$_3$, R—C(O)—N$_3$, R—O—C(O)—N$_3$, (RO$_2$)—(PO)—N$_3$, R$_2$P(O)—N$_3$, R$_3$—Si—N$_3$, R—SO$_2$—N$_3$, or combinations thereof, wherein R can be an unsubstituted or inertly substituted alkyl, aryl, ether, siloxane, silane, heterocycle, haloalkyl, haloaryl, or any combination thereof.

Nonlimiting examples of azo compounds suitable for use in this disclosure include R$^1$—N$_2$—R$^2$ compounds, wherein R$^1$ and R$^2$ can each independently be an unsubstituted or inertly substituted alkyl, aryl, ether, siloxane, silane, heterocycle, haloalkyl, haloaryl, or any combination thereof.

In embodiments, the mixture subjected to reactive extrusion comprises a coagent. Without wishing to be limited by theory, a coagent is a compound that facilitates the formation of a higher concentration of reactive sites. Many nonproductive reactions such as polymer scission or other deleterious reactions are kinetically favored, and typically only a very high concentration of reactive sites (e.g., radical sites) on the polymer backbone allows for effective product formation to occur at all. Generally, the coagent increases the local concentration of highly reactive groups (e.g., radicals). In embodiments, the coagent comprises a Type I coagent, a Type II coagent or combinations thereof.

Herein, a Type I coagent refers to polar low molecular weight (e.g., less than about 500 g/mol) compounds which form radicals through addition reactions. In embodiments, the Type I coagent comprises multifunctional acrylates, multifunctional methacrylates, dimaleimides, or combinations thereof. Examples of Type I coagents suitable for use in the present disclosure include without limitation trimethylolpropane triacrylate, trimethylolpropane trimethacrylate, ethylene glycol diacrylate, N,N'-m-phenylene dimaleimide, zinc diacrylate and zinc dimethacrylate.

Herein, a Type II coagent refers to materials that form radicals primarily through hydrogen abstraction. Type II coagents suitable for use in the present disclosure include without limitation allyl-containing cyanurates, isocyanurates, phthalates, homopolymers of dienes, copolymers of dienes, vinyl aromatics or combinations thereof. Examples of Type II coagents suitable for use in the present disclosure include without limitation triallyl cyanurate (TAC), tri-allyl-iso-cyanurate, pentaerythriol triacrylate, p-benzoquinone, vinyl poly(butadiene), vinyl styrene-butadiene copolymer.

The presence of the diene during production of the polymer as per the method of this disclosure promotes the formation of cross-linking in situ. Thus, although post-reactor extrusion to enhance cross-linking is noted hereinabove, it is noted that in embodiments, the PIMS resin does not undergo any post reactor modification (e.g., inclusion of processing aids) to improve the melt strength (e.g., increase the cross-linking) of the material prior to final use, e.g., pipe formation as described hereinbelow. In particular, in embodiments, peroxide(s) or other conventional post-reactor cross-linking agents are not utilized downstream of the polymerization zone(s) during the finishing to build molecular weight via crosslinking of the polymer, as the virgin PIMS has sufficient melt strength without such post reactor peroxide processing. In alternative embodiments, post reactor processing is utilized to further enhance cross-linking of the polymer product, but to a lesser extent (e.g., less quantity of peroxide) than needed to provide equivalent melt strength in a virgin resin formed in the absence of the diene(s).

A PIMS product may be subjected to other post reactor treatment as known in the art. For example, the PIMS may be pelletized, which may include the addition of a base additive package of the type commonly added to commercial PE resins (e.g., antioxidants, stabilizer). In embodiments, the PIMS resin does not include any post reactor polymer processing aids (PPAs) of the type known to those skilled in the art to enhance the melt strength.

A PIMS of the type disclosed herein may be utilized in any suitable application. For example, PIMS of the type disclosed herein may be formed into various articles, including but not limited to, household containers, utensils, film products, drums, fuel tanks, pipes, geomembranes, and liners.

Polymeric pipes have replaced metal pipes in many applications such as high-pressure fluid transportation. Polymeric pipes have several advantages over metal pipes including being of relatively lighter weight, more corrosion resistant, inexpensive, more thermally and electrically insulative, tougher, more durable and more easily shaped during manufacture. Such pipes are exposed to numerous stresses during their lifetime that may result in cracks or breaks that are expensive to repair, especially in situations where the pipe is buried in a structure or underground. As such polymeric pipes may be required to meet industry-defined standards depending on their intended use.

Polymeric material used in the fabrication of pipe has often been optimized to provide a more durable end-use article. One such optimization may involve the use of a multimodal polymer composition as the polymeric material. A challenge to the use of a multimodal polymer composition as the polymeric material in the fabrication of pipe is that these compositions, when melted to form a polymer melt, may display poor processing characteristics such as melt fractures, which are surface irregularities that occur during the extrusion process when the production rate is increased. The poor processing characteristics of these materials may result in a reduced production rate and/or product having undesirable physical properties and/or appearance. Polymeric compositions according to this disclosure may be utilized to fabricate polymeric pipe.

In an aspect, the PIMS resin of this disclosure is fabricated into a pipe by a plastics shaping process such as extrusion. A method of making a polymeric pipe comprises extruding the polymer or copolymer in a molten state through a die to form the polymeric pipe and cooling the pipe.

Pipe extrusion in the simplest terms is performed by melting, conveying polyethylene pellets into a particular shape (generally an annular shape), and solidifying that shape during a cooling process. There are numerous steps to pipe extrusion as provided below. The polymer feedstock can either be a pre-pigmented polyethylene resin or it can be a mixture of natural polyethylene and color concentrate (referred to as "Salt and Pepper blends"). In North America, the most common feedstock for pipe extrusion is "Salt and Pepper blends." In Europe and other areas of the world, the most common feedstock for pipe extrusion is pre-pigmented polyethylene resin. Feedstock is controlled to obtain the proper finished product (pipe) and ultimate consumer specifications.

The feedstock is then fed into an extruder. The most common extruder system for pipe production is a single-screw extruder. The purpose of the extruder is to melt, convey, and homogenize the polyethylene pellets. Extrusion temperatures typically range from 178° C. to 250° C. depending upon the extruder screw design and flow properties of the polyethylene.

The molten polymer is then passed through a die. The die distributes the homogenous polyethylene polymer melt around a solid mandrel, which forms it into an annular shape. Adjustments can be made at the die exit to try to compensate for polymer sag through the rest of the process. In order for the pipe to meet the proper dimensional parameters, the pipe is then sized. There are two methods for sizing: vacuum or pressure. Both employ different techniques and different equipment.

Next, the pipe is cooled and solidified in the desired dimensions. Cooling is accomplished by the use of several water tanks where the outside pipe is either submerged or water is sprayed on the pipe exterior. The pipe is cooled from the outside surface to the inside surface. The interior wall and inside surfaces of the pipe can stay very hot for a long period of time, as polyethylene is a poor conductor of heat. Finally, the pipe is printed and either coiled or cut to length.

In embodiments, the PIMS is formed into a large diameter pipe, wherein large diameter ranges from about 8 inches to about 78 inches, alternatively from about 12 inches to about 42 inches, or alternatively from about 16 inches to about 36 inches. In embodiments, the PIMS used to prepare pipe has a density from about 0.925 g/mL to about 0.942 g/mL, alternatively from about 0.928 g/mL to about 0.940 g/mL, from about 0.946 g/mL to about 0.952 g/mL, or alternatively from about 0.930 g/mL to about 0.940 g/mL as determined in accordance with ASTM D1505. In embodiments, the pipe produced from the herein-disclosed PIMS is a low slump pipe, as indicated by high viscosity at low shear rates.

In embodiments, a PIMS of this disclosure or a pipe produced from a PIMS of this disclosure exhibits an improvement in one or more property over a polymer or a pipe produced from a polymer produced in the same manner as the PIMS but absent the diene(s). The improved property may be the resistance to slow crack growth (as measured, for example, by the Pennsylvania Notch Tensile Test (PENT; ASTM F1473) and the Full Notch Creep Test (FNCT; ISO 16770.3), resistance to rapid crack propagation (RCP; as measured, for example, by the Small-Scale Steady-State (S4) test), impact strength (as measured, for example, via the Razor-Notched Charpy Impact Test (ASTM F2231), or Izod Impact test (ASTM D256)), flexural modulus (as measured, for example, via ASTM D790), elongation at break (as measured, for example, via ASTM D638), tensile strength at break or yield (as measured, for example, via ASTM D638), stiffness (as per Young's modulus, determined, for example, via ASTM D638), thermal stability (as measured, for example, via ASTM D3350), hydrostatic design basis (as measured, for example, via ASTM D2837), long-term hydrostatic strength (LTHS; estimated using USA standard ASTM D 2837; minimum required strength (MRS; estimated using the ISO 9080 standard), crossover modulus or frequency, surface melt fracture (SMF), slip-stick fracture (SSF), or a combination thereof. Further discussion of such measurements can be found in U.S. patent application Ser. No. 13/660,747, entitled, "Controlling Melt Fracture in Bimodal Resin Pipe, and U.S. patent application Ser. No. 14/933,847, entitled, "Radically Coupled Resins and Methods of Making and Using Same", the disclosure of each of which is hereby incorporated herein in its entirety for all purposes not contrary to this disclosure.

As noted hereinabove, the polymer production method according to this disclosure comprising diene(s) incorporation in-reactor may enable the production of a PIMS without the utilization of peroxides which are conventionally employed to build molecular weight. Thus, in embodiments, the herein-disclosed method provides for in-reactor (rather than, or in addition to, post-reactor) control of melt strength. In embodiments, the amount of peroxide(s) utilized in fluff processing is reduced (or eliminated), which may provide for enhanced safety, more reproducible, and/or lower cost finishing relative to conventional post-reactor processing with peroxide(s).

The herein-disclosed polymer production method may provide for a PIMS having improved shear properties due to the formation of LCB which may enhance processability. The enhanced LCB may positively impact properties of products produced from the PIMS, such as, without limitation, the fusion in pipe. For example, the NDR (Natural Draw Ratio) of resins was decreased upon the addition of diene, indicating improved mechanical properties.

The herein-disclosed method provides for the creation of unique resins in the polymerization reactor(s) rather than post-reactor. In embodiments, incorporation of the diene(s) during formation of the HMW component, the LMW component, or both, via introduction of the diene(s) into a first polymerization reactor or zone (in which either the HMW or the LMW component is produced), a second polymerization reactor or zone (in which either the LMW or the HMW component is produced), or both, is utilized to build a desired polymer resin.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Under an isobutane purge a TIBA solution (25% in heptanes) was charged to a cold one gallon reactor followed by SSA and metallocene solution, or ZN, and 1-hexene (for some case). The reactor was closed and 2 liters isobutane were added. The reactor was quickly heated to within 5 degrees of the run temperature and the ethylene feed was opened, ethylene was fed on demand to maintain the reactor pressure. Hydrogen (for some case) was then introduced into the reactor during the polymerization process. At the end of the reaction, the reactor contents were flared; the reactor was purged with nitrogen, and then opened. The polymer powder was dried overnight at 60° C. under vacuum.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity $|\eta^*|$ versus frequency ($\omega$) data were then curve fitted using the modified three parameter Carreau-Yasuda (CY) empirical model to obtain the zero shear viscosity—$\eta_0$, characteristic viscous relaxation time—$\tau_\eta$, and the breadth parameter—$\alpha$. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: $|\eta^*(\omega)|$=magnitude of complex shear viscosity;

$\eta_0$=zero shear viscosity;

$\tau_\eta$=viscous relaxation time (Tau($\eta$));

$\alpha$="breadth" parameter (CY-a parameter);

n=fixes the final power law slope, fixed at 2/11; and $\omega$=angular frequency of oscillatory shearing deformation.

Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety.

Example 1: PE PIMS Produced Utilizing Ziegler-Natta Catalyst

PE PIMS according to this disclosure were produced utilizing a commercial Ziegler-Natta catalyst. Ziegler-Natta component contained about 14-19 wt. % titanium compounds ($TiCl_3/TiCl_4$), about 17-24 wt. % $MgCl_2$, about 9-13 wt. % aluminum compounds, about 43-53 wt. % polyethylene, and less than about 3 wt. % heptane. The overall metal concentration for Ti was in the 3.5-5.9 wt. % range, and for Mg was in the 4.1-5.8 wt. % range. Rheology parameters were determined as described hereinabove. Both high molecular weight, low density Ziegler-Natta PIMS resins and low molecular weight, high density Ziegler-Natta PIMS resins were produced.

Example 1A: High Molecular Weight, Low Density Ziegler Natta PE PIMS Resin

The polymerization conditions utilized to prepare four high molecular weight, low density Ziegler-Natta PIMS resins, Sample IDs 1, 2, 3, and 4, along with a comparative resin C1 comprising no diene, are presented in Table 1. The PIMS was a copolymer formed utilizing the amounts of comonomers ethylene and 1-hexene in the presence of 1,5-hexadiene, as indicated in Table 1. Sample 1 comprised 0 ppm 1,5-hexadiene; Sample 2 comprised 69 ppm of 1,5-hexadiene; Sample 3 comprised 138 ppm of 1,5-hexadiene; and Sample 4 comprised 1378 ppm of 1,5-hexadiene. An amount of 0.005 gram of ZN catalyst was utilized.

The high load melt index (HLMI; g/10 min), the density (g/mL), the zero shear viscosity $\eta_0$ (Pa-s), the relaxation time $\tau_\eta$ (s), the Carreau-Yasuda "a" parameter (a_eta), the number average molecular weight $M_n$ (g/mol), the weight average molecular weight $M_w$ (g/mol), the z-average molecular weight $M_z$ (g/mol), and the molecular weight distribution or polydispersity index PDI ($M_w/M_n$), were determined as described herein, and are also presented in Table 1.

TABLE 1

| | | | | | | | | |
|---|---|---|---|---|---|---|---|---|
| High Molecular Weight Low Density Ziegler-Natta PE PIMS Resins | | | | | | | | |
| Sample ID | Temp (° C.) | C2 (psi) | H2 (Δpsi) | 1-hexene (g) | Diene (mL) | PE (g) | HLMI | Density | $\eta_0$ |
| C1 | 85 | 266 | 25 | 70 | | 163 | 0.78 | 0.9281 | 2.91E+05 |
| 1 | 85 | 266 | 25 | 70 | 0.5 | 186 | 0.63 | 0.9259 | 4.13E+05 |
| 2 | 85 | 266 | 25 | 70 | 1 | 195 | 0.47 | 0.9273 | 4.86E+05 |
| 3 | 85 | 266 | 25 | 70 | 5 | 235 | 0.31 | 0.926 | 4.16E+05 |
| 4 | 85 | 266 | 25 | 70 | 10 | 223 | 0.55 | 0.9263 | 3.54E+05 |
| | $\tau_\eta$ | a_eta | Mn/1000 | Mw/1000 | Mz/1000 | Mw/Mn | | |
| C1 | 7.26E−01 | 0.3603 | 70.57 | 321.45 | 968.91 | 4.56 | | |
| 1 | 1.08E+00 | 0.3701 | 59.88 | 343.6 | 1069.81 | 5.74 | | |
| 2 | 1.29E+00 | 0.3683 | 74.6 | 376.8 | 1253.52 | 5.05 | | |
| 3 | 1.08E+00 | 0.3814 | 76.69 | 368.38 | 1366.1 | 4.8 | | |
| 4 | 9.01E−01 | 0.3802 | 82.72 | 347.08 | 1080.33 | 4.2 | | |

Figure 1B:
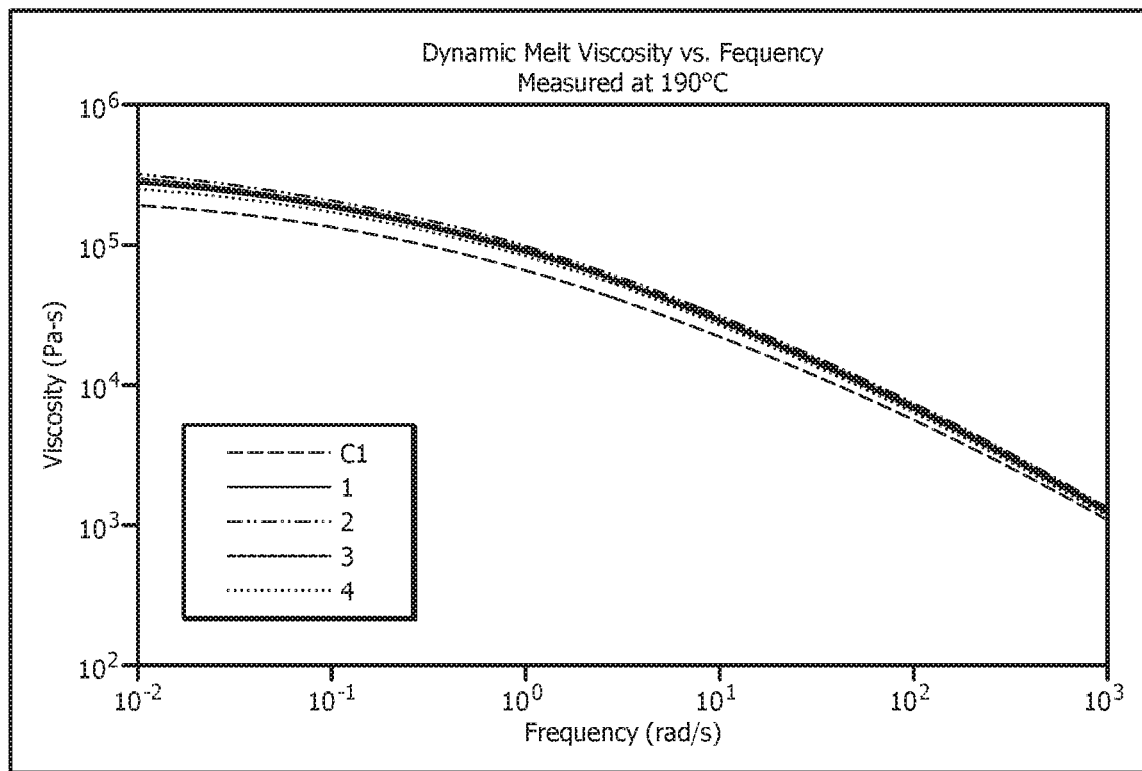
FIG. 1B is a plot of the dynamic melt viscosity of the high molecular weight, low density, Ziegler-Natta PE PIMS samples from Example 1A.

As can be seen from the data in Table 1, the zero shear viscosity is higher for the inventive PIMS formed in the presence of the diene than for the comparative polymer C1. Enhanced zero shear viscosity indicates the presence of long chain branching, which provides increased melt strength, and thus improved processability for the PIMS of this disclosure. FIG. 1A is a plot of the molecular weight distribution profile of the high molecular weight, low density Ziegler-Natta PE PIMS and comparative samples from Example 1A. FIG. 1B is a plot of the dynamic melt viscosity of the high molecular weight, low density Ziegler-Natta PE PIMS samples and the comparative sample from Example 1A. The Mw and Mz molecular weights of the sample PIMS of this disclosure, formed with the addition of diene, were increased relative to the comparative sample.

Example 1B: Low Molecular Weight, High Density Ziegler Natta PE PIMS Resin

The polymerization conditions utilized to prepare a low molecular weight, high density Ziegler-Natta PIMS resin, Sample ID 5, along with a comparative resin C2 comprising no diene, are presented in Table 2. The PIMS was a homopolymer formed without 1-hexene, and utilizing 1,5-hexadiene as the diene, as indicated in Table 2. Sample 5 comprised 69 ppm 1,5-hexadiene. An amount of 0.005 gram of ZN catalyst was utilized.

The melt index (MI; g/10 min), the density (g/mL), the zero shear viscosity $\eta_0$ (Pa-s), the relaxation time $\tau_\eta$ (s), the Carreau-Yasuda "a" parameter (a_eta), the number average molecular weight $M_n$ (g/mol), the weight average molecular weight $M_w$ (g/mol), the z-average molecular weight $M_z$ (g/mol), and the molecular weight distribution or polydispersity index PDI ($M_w/M_n$), were determined as described herein, and are also presented in Table 2.

TABLE 2

| | | | | | | | | | | |
|---|---|---|---|---|---|---|---|---|---|---|
| Low Molecular Weight High Density Ziegler-Natta PE PIMS Resins | | | | | | | | | | |
| Sample ID | Temp (° C.) | C2 (psi) | H2 (Δpsi) | 1-hexene (g) | Diene (mL) | PE (g) | MI | Density | $\eta_0$ | $\tau_\eta$ |
| C2 | 95 | 440 | 400 | 0 | 0 | 189 | 6.0 | 0.9682 | 2.21E+03 | 3.24E−03 |
| 5 | 95 | 440 | 400 | 0 | 0.5 | 201 | 5.0 | 0.9675 | 2.84E+03 | 5.15E−03 |
| | a_eta | Mn/1000 | Mw/1000 | Mz/1000 | Mw/Mn | | | | | |
| | 0.2917 | 12.08 | 88.09 | 387.22 | 7.29 | | | | | |
| | 0.3070 | 12.21 | 93.28 | 397.05 | 7.64 | | | | | |

As can be seen from the data in Table 2, the zero shear viscosity is higher for the inventive PIMS formed in the presence of the diene than for the comparative polymer C2. Enhanced zero shear viscosity indicates the presence of long chain branching, which indicates an increased melt strength, and thus improved processability for the PIMS of this disclosure.

Figure 2A:
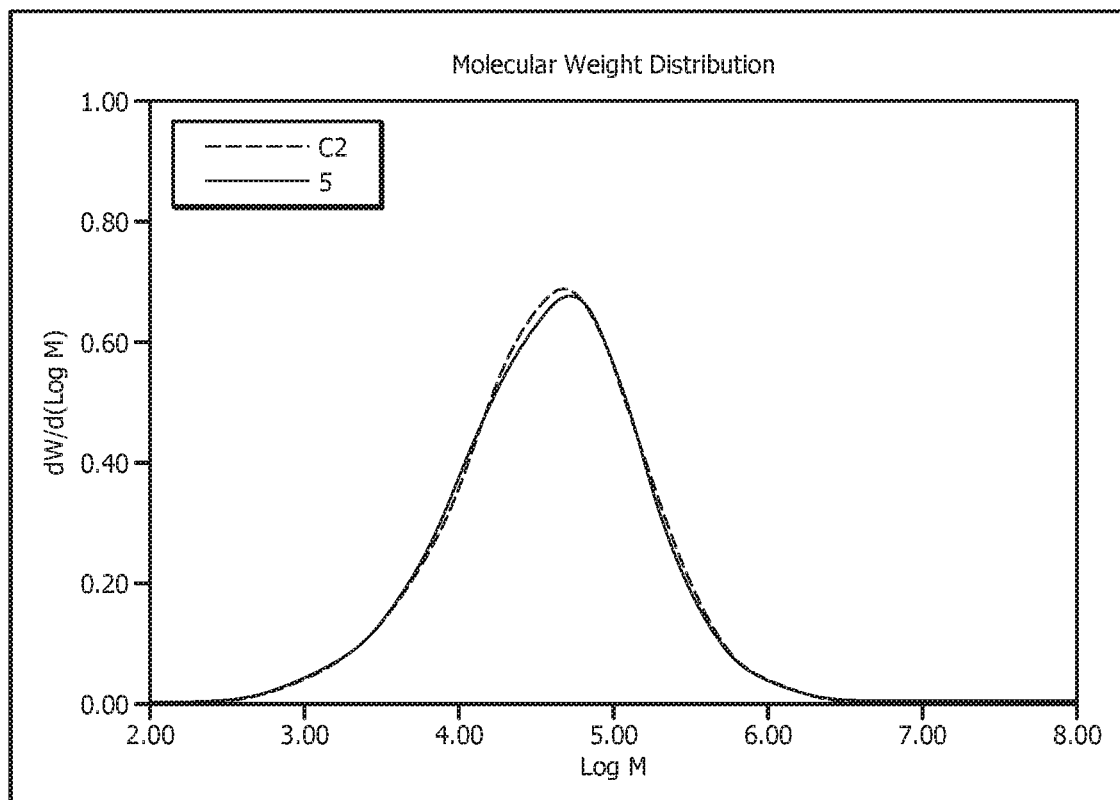
FIG. 2A is a plot of the molecular weight distribution profile of the low molecular weight, high density, Ziegler-Natta PE PIMS samples from Example 1B.
Figure 2B:
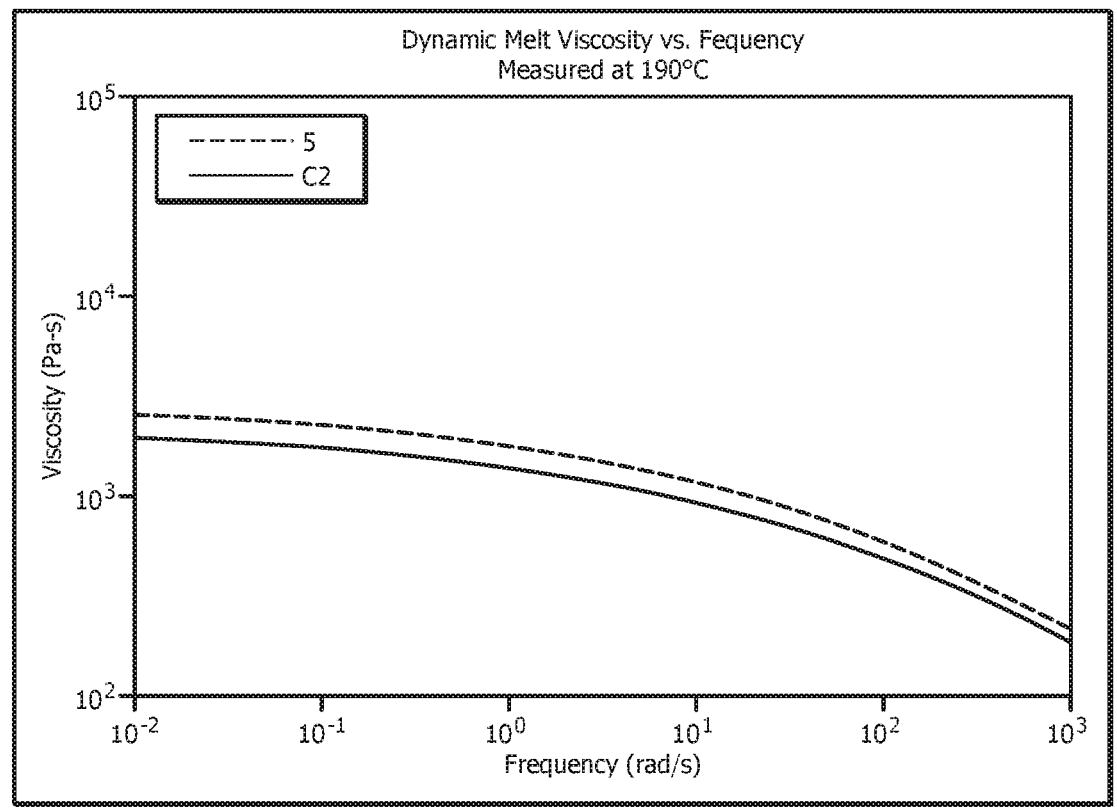
FIG. 2B is a plot of the dynamic melt viscosity of the low molecular weight, high density, Ziegler-Natta PE PIMS samples from Example 1B.

FIG. 2A is a plot of the molecular weight distribution profile of the low molecular weight, high density Ziegler-Natta PE PIMS sample and the comparative sample from Example 1B. FIG. 2B is a plot of the dynamic melt viscosity of the low molecular weight, high density Ziegler-Natta PE PIMS sample and the comparative sample from Example 1B. The molecular weights of the sample PIMS of this disclosure were increased relative to the comparative sample.

Example 2: PE PIMS Produced Utilizing Metallocene Catalyst

Example 2A: PE PIMS Produced Utilizing Single Site Metallocene Catalyst

PE PIMS according to this disclosure were produced, utilizing a single site metallocene catalyst, as described in U.S. Pat. No. 7,064,225, the disclosure of which is hereby incorporated herein in its entirety for all purposes not contrary to this disclosure. The single site metallocene catalyst comprises SSA/MBTF similar to U.S. Pat. No.

7,294,599. The activator support used in conjunction with the metallocene catalyst was a chemically treated solid oxide support of the type described in U.S. Pat. Nos. 7,294,599; 7,601,665; 7,884,163; 8,309,485; 8,623,973; 8,703,886; and 9,023,959. Triisobutylaluminum (TIBA) was the cocatalyst in all cases. The catalyst comprised 0.001 gram metallocene, 0.1 gram of SSA activator M-SSA support, and 0.5 mL (25%) of TIBA co-catalyst.

The polymerization conditions utilized to prepare three metallocene PIMS resins, Sample IDs 6, 7, and 8, along with a comparative resin C3 comprising no diene, are presented in Table 3. The PIMS were copolymers formed utilizing ethylene and 1-hexene in the presence of 1,5-hexadiene, as indicated in Table 3. Sample 6 comprised 6.9 ppm 1,5-hexadiene; Sample 7 comprised 69 ppm of 1,5-hexadiene; and Sample 8 comprised 276 ppm of 1,5-hexadiene.

Rheology parameters were determined as described hereinabove. The melt index (MI; g/10 min), the density (g/mL), the zero shear viscosity $\eta_o$ (Pa-s), the relaxation time $\tau_\eta$ (s), the Carreau-Yasuda "a" parameter (a_eta), the number average molecular weight $M_n$ (g/mol), the weight average molecular weight $M_w$ (g/mol), the z-average molecular weight $M_z$ (g/mol), and the molecular weight distribution or polydispersity index PDI ($M_w/M_n$), were determined as described herein, and are also presented in Table 3.

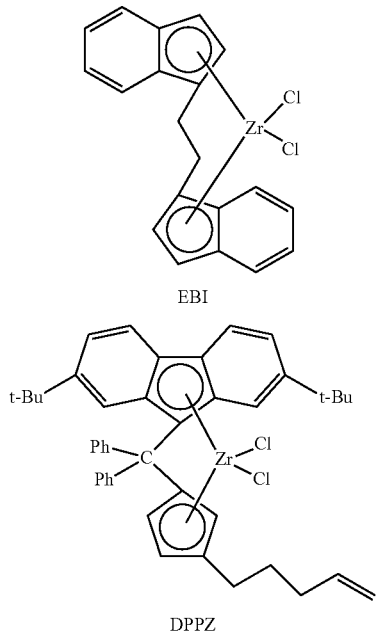

EBI

DPPZ

TABLE 3

Single Site Metallocene PE PIMS Resins

| Sample ID | 1,5-hexadiene (mL) | Temp (° C.) | C2 (psi) | 1-hexene (g) | H2 (ppm) | MI | $\eta_o$ | $\tau_\eta$ |
|---|---|---|---|---|---|---|---|---|
| C3 | 0 | 80 | 320 | 30 | 100 | 1.1 | 9.09E+03 | 1.08E−02 |
| 6 | 0.05 | 80 | 320 | 30 | 100 | 0.83 | 1.23E+04 | 1.58E−02 |
| 7 | 0.5 | 80 | 320 | 30 | 100 | 0.7 | 1.27E+04 | 1.65E−02 |
| 8 | 2 | 80 | 320 | 30 | 100 | 0.65 | 1.38E+04 | 1.49E−02 |

| | a_eta | Mn (Kg/mol) | Mw (Kg/mol) | Mz (Kg/mol) | Mw/Mn | Mz/Mw |
|---|---|---|---|---|---|---|
| C3 | 0.3516 | 39.17 | 102.74 | 207.83 | 2.62 | 2.02 |
| 6 | 0.3472 | 39.44 | 109.43 | 220.12 | 2.77 | 2.01 |
| 7 | 0.3680 | 45.48 | 112.31 | 213.25 | 2.47 | 1.90 |
| 8 | 0.3399 | 43.72 | 111.52 | 223.95 | 2.55 | 2.01 |

Figure 3A:
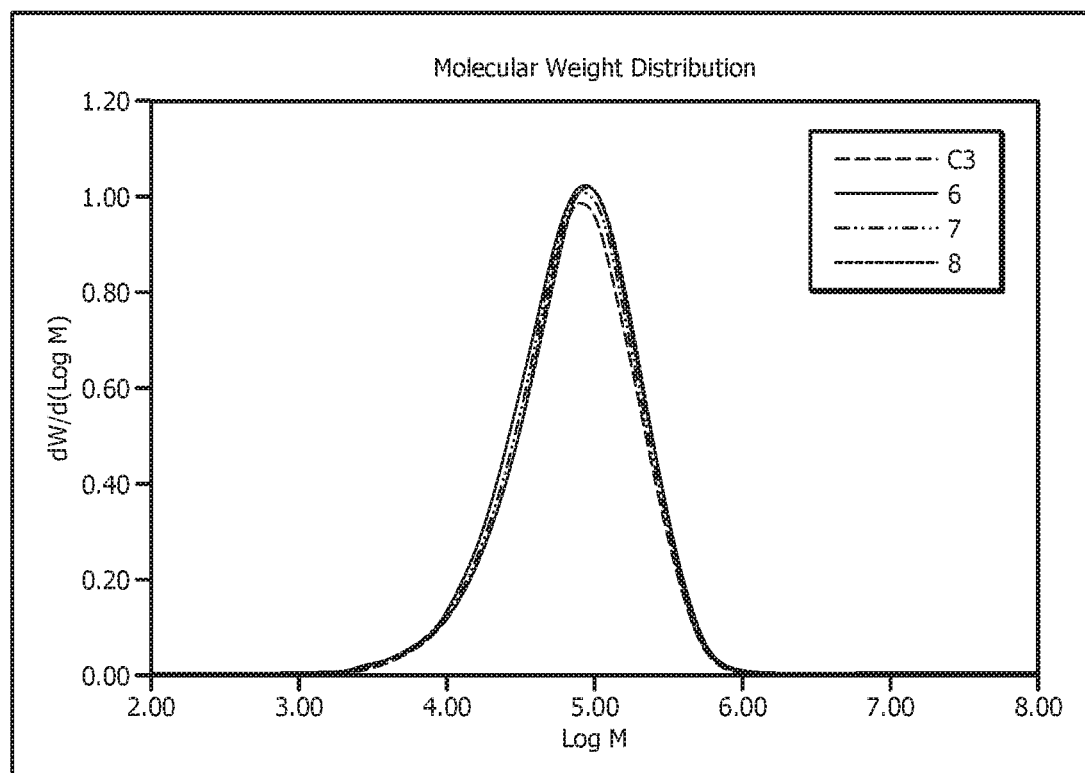
FIG. 3A is a plot of the molecular weight distribution profile of single-site metallocene PE PIMS samples from Example 2A.
Figure 3B:
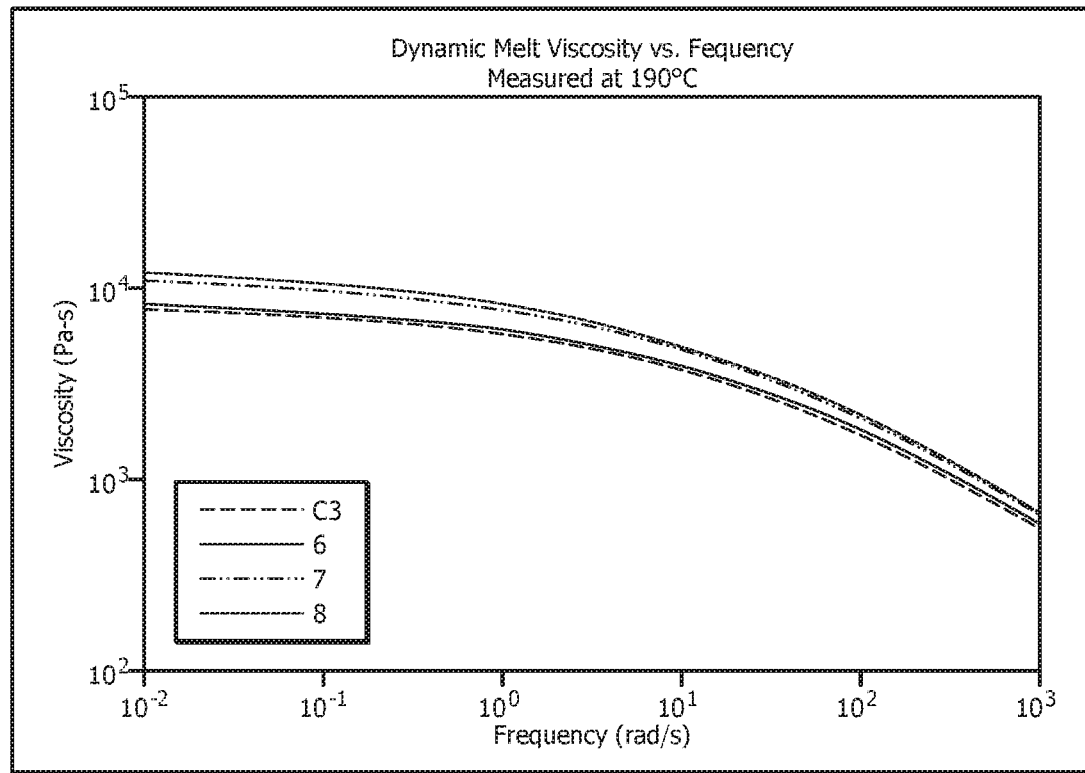
FIG. 3B is a plot of the dynamic melt viscosity of single-site metallocene PE PIMS samples from Example 2A.

As can be seen from the data in Table 3, the zero shear viscosity is higher for the inventive PIMS formed in the presence of the diene than for the comparative polymer C3. Enhanced zero shear viscosity indicates the presence of long chain branching, which indicates an increased melt strength, and thus improved processability for the PIMS of this disclosure. FIG. 3A is a plot of the molecular weight distribution profile of the metallocene PE PIMS samples and the comparative sample from Example 2A. FIG. 3B is a plot of the dynamic melt viscosity of the metallocene PE PIMS samples and the comparative sample from Example 2A. The molecular weights and zero shear viscosity the sample PIMS of this disclosure were increased relative to the comparative sample, while the CY-a eta was decreased.

Example 2B: PE PIMS Produced Utilizing Dual Metallocene Catalyst

PE PIMS according to this disclosure were produced utilizing a dual metallocene catalyst. The dual metallocene catalyst: TIBA (0.5 mL 35%)+SSA (0.2 grams)+EBI (0.001 grams)+DPPZ (0.001 grams). The structures of EBI and DPPZ are:

The polymerization conditions utilized to prepare four dual metallocene PIMS resins, Sample IDs 9, 10, 11, and 12, along with a comparative resin C4 comprising no diene, are presented in Table 4. The PIMS were copolymers formed utilizing ethylene and 1-hexene in the presence of 1,5-hexadiene, as indicated in Table 4. Sample 9 comprised 13.8 ppm 1,5-hexadiene; Sample 10 comprised 68.9 ppm of 1,5-hexadiene; Sample 11 comprised 137.8 ppm of 1,5-hexadiene; and Sample 11 comprised 275.6 ppm of 1,5-hexadiene. The catalyst comprised: 0.5 mL of TIBA (25%)+ 0.15 grams of SSA+0.001 grams of EBI+0.001 grams of DPPZ.

Rheology parameters were determined as described hereinabove. The melt index (MI; g/10 min), the density (g/mL), the zero shear viscosity $\eta_o$ (Pa-s), the relaxation time $\tau_\eta$ (s), the Carreau-Yasuda "a" parameter (a_eta), the number average molecular weight $M_n$ (g/mol), the weight average molecular weight $M_w$ (g/mol), the z-average molecular weight $M_z$ (g/mol), and the molecular weight distribution or polydispersity index PDI ($M_w/M_n$), were determined as described herein, and are also presented in Table 4.

TABLE 4

Dual Metallocene PE PIMS Resins

| Sample ID | 1,5-hexadiene (mL) | Temp (° C.) | C2 (psi) | 1-hexene (g) | H2 (ppm) | MI | Density | $\eta_0$ | $\tau_\eta$ |
|---|---|---|---|---|---|---|---|---|---|
| C4 | 0 | 80 | 320 | 10 | 100 | 0.25 | 0.947 | 1.43E+05 | 1.41E+00 |
| 9 | 0.1 | 80 | 320 | 10 | 100 | 0.26 | 0.9508 | 8.23E+05 | 1.48E+00 |
| 10 | 0.5 | 80 | 320 | 10 | 100 | 0.26 | 0.9498 | 2.05E+05 | 2.34E+00 |
| 11 | 1 | 80 | 320 | 10 | 100 | 0.25 | 0.9497 | 1.93E+05 | 2.12E+00 |
| 12 | 2 | 80 | 320 | 10 | 100 | 0.29 | 0.9498 | 2.42E+05 | 2.55E+00 |

| | a_eta | Mn/1000 | Mw/1000 | Mz/1000 | Mw/Mn | Mz/Mw |
|---|---|---|---|---|---|---|
| C4 | 0.2228 | 15.85 | 120.18 | 737.1 | 7.58 | 6.13 |
| 9 | 0.1242 | 15.82 | 123.11 | 599.47 | 7.78 | 4.87 |
| 10 | 0.2259 | 18.3 | 138.3 | 666.09 | 7.56 | 4.82 |
| 11 | 0.2330 | 16.91 | 133.94 | 671.27 | 7.92 | 5.01 |
| 12 | 0.2046 | 17.4 | 128.54 | 660.52 | 7.39 | 5.14 |

As can be seen from the data in Table 4, the zero shear viscosity is higher for the inventive PIMS formed in the presence of the diene than for the comparative polymer C4. Enhanced zero shear viscosity indicates the presence of long chain branching, which indicates an increased melt strength, and thus improved processability for the PIMS of this disclosure.

Figure 4A:
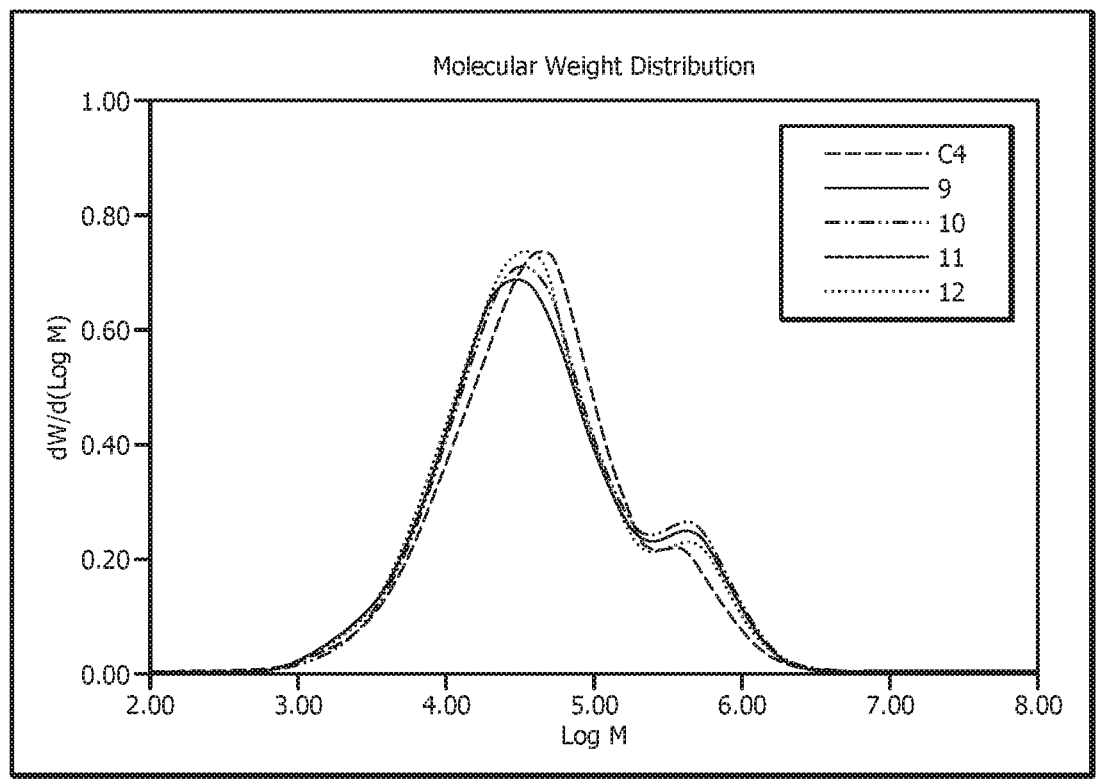
FIG. 4A is a plot of the molecular weight distribution profile of dual metallocene PE PIMS samples from Example 2B.
Figure 4B:
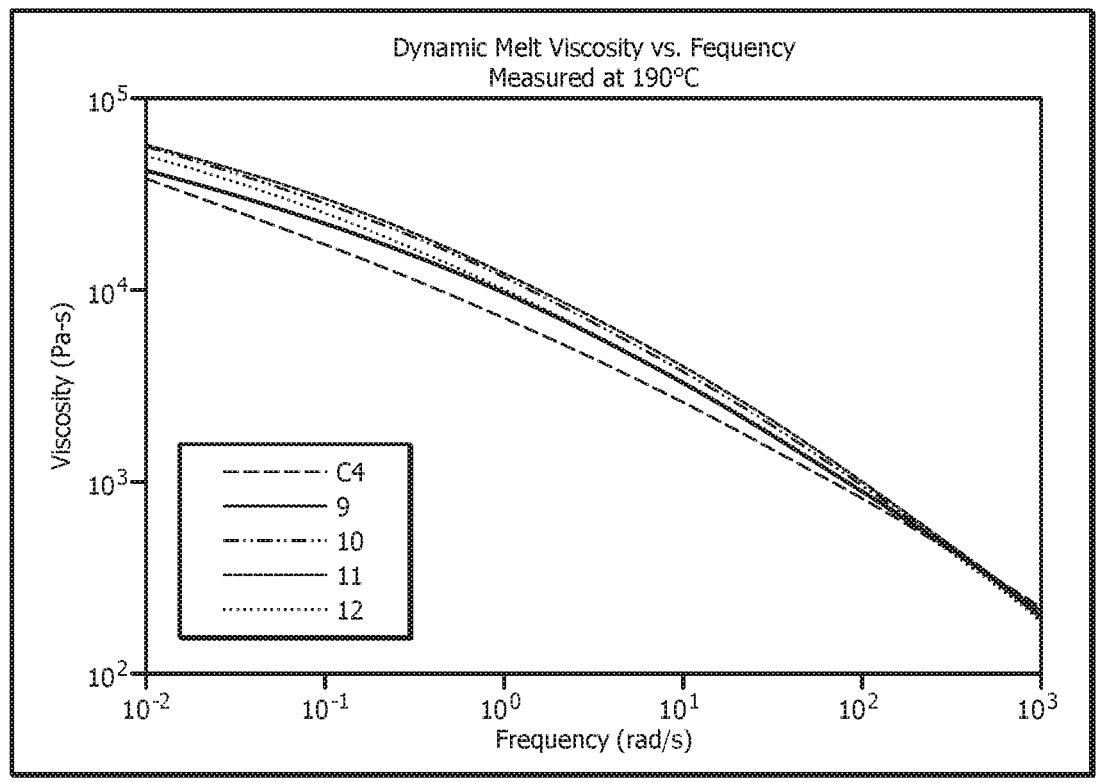
FIG. 4B is a plot of the dynamic melt viscosity of dual metallocene PE PIMS samples from Example 2B.

FIG. 4A is a plot of the molecular weight distribution profile of the dual metallocene PE PIMS samples and the comparative sample from Example 2B. FIG. 4B is a plot of the dynamic melt viscosity of the dual metallocene PE PIMS samples and the comparative sample from Example 2B. The Mw and zero shear viscosity of the sample PIMS of this disclosure were increased relative to those of the comparative sample.

ADDITIONAL DISCLOSURE

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

The following are nonlimiting, specific embodiments in accordance with the present disclosure:

A: A method comprising introducing a polymerization feed comprising an α-olefin, a diluent, and a diene to a polymerization system, under polymerization conditions, whereby a polymer product is produced, wherein the diene is present at a level in the range of from about 1 ppm to about 1000 ppm based on the diluent.

B: A method comprising enhancing the long chain branching (LCB) of a polymer produced in a dual loop slurry reactor process by introducing a diene during production of the polymer.

C: A method comprising enhancing the long chain branching (LCB) of a polymer produced from a Ziegler-Natta catalyst by introducing a diene during production of the polymer.

Each of embodiments A, B, and C may have one or more of the following additional elements. Element 1: wherein the diene is selected from dienes having a boiling point of less than or equal to about 110° C. Element 2: wherein the diene is selected from conjugated dienes, non-conjugated dienes, or combinations thereof. Element 3: wherein the diene is selected from C6-C15 straight chain hydrocarbon non-conjugated dienes, C6-C15 branched chain hydrocarbon non-conjugated dienes, C6-C15 cyclic hydrocarbon non-conjugated dienes, or combinations thereof. Element 4: wherein the non-conjugated diene is selected from straight chain acyclic dienes, including 1,5-heptadiene; 1,4-pentadiene; 1,6-heptadiene; 1,7-octadiene; 1,4-hexadiene; 1,9-decadiene; branched chain acyclic dienes, including 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes, including 1,4-cyclohexadiene, 1,5-cyclooctadiene and 1,5-cyclododecadiene; multi-ring alicyclic fused and bridged ring dienes, including dicyclopentadiene, tetrahydroindene, methyl tetrahydroindene; alkenyl, alkylidene, cycloalkenyl and cycloalkylidene norbornenes, including 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene and 5-cyclohexylidene-2-norbornene; or combinations thereof. Element 5: wherein the diene is a conjugated diene selected from 1,3-hexadiene, 2,4-hexadiene, 1,3-pentadiene, 1,3-butadiene, 2-methyl-1,3-butadiene, 4-methyl-1,3-pentadiene, 1,3-cyclopentadiene, or combinations thereof. Element 6: wherein the diene is selected from 1,5-hexadiene, 1,3-butadiene, isoprene, or combinations thereof. Element 7: wherein the α-olefin comprises ethylene, and the polymer product comprises polyethylene. Element 8: wherein the polymer product is a polyethylene homopolymer. Element 9: wherein the polymer product is a copolymer of ethylene and a comonomer. Element 10: wherein the comonomer is 1-hexene, 1-butene, or 1-octene. Element 11: wherein the polymer product has an enhanced melt strength relative to a polymer product produced via the same method but absent the presence of the diene. Element 12: wherein the polymer product exhibits a 2, which is the number of long chain branches (LCB) per million carbon atoms, that is greater than that of a polymer product produced via the same method but absent the presence of the diene. Element 13: wherein the polymer product exhibits a 2 greater than or equal to about 15 LCB/$10^6$ carbons. Element 14: wherein the polymer product exhibits an LCB content, as determined by α, which is the fraction of the total carbons that are long chain vertexes determined according to the equation:

$$\alpha = \frac{v_3}{M_W/M_0}$$

where
$v_3$=number of long branch vertexes,
$M_W$=weight average molecular weight (g/mol), and
$M_0$=molecular weight of repeating unit (Da),
that is greater than that of a polymer product produced via the same method but absent the presence of the diene. Element 15: wherein the polymer product exhibits an α in the range of from about 0.000001 to about 0.001. Element 16: wherein the polymer product has a zero shear viscosity, or $\eta_0$, that is greater than that of a polymer product produced via the same method but absent the presence of the diene. Element 17: wherein the polymer product has an $\eta_0$ that is in the range of from about 10000 Pa-s to about 100000000 Pa-s. Element 18: wherein the polymerization system comprises first and second polymerization zones in series, and wherein the diene is introduced into the first polymerization zone, the second polymerization zone, or both the first polymerization zone and the second polymerization zone. Element 19: wherein the polymerization system comprises one or more reactors selected from loop slurry reactors, fluidized bed gas phase reactors, multi-zone reactors, batch reactors, and CSTR reactors. Element 20: wherein the first and second polymerization zones in series comprise dual loop slurry reactors in series. Element 21: further comprising altering the melt strength, the impact strength, the crossover modulus, or a combination thereof, of the polymer product by adjusting the amount of the diene, the type of the diene, or both the amount and the type of the diene, introduced into the first polymerization zone, the second polymerization zone, or both the first polymerization zone and the second polymerization zone. Element 22: wherein the polymer product is a bimodal polyethylene resin. Element 23: wherein the bimodal polyethylene resin comprises a high molecular weight (HMW) component and a low molecular weight (LMW) component, wherein the LMW component has a weight average molecular weight ($M_w$) ranging from about 350 g/mol to about 75,000 g/mol, and is present in the PE resin in an amount of from about 0 weight percent (wt. %) to less than about 100 wt. %, based on the total polymer weight; wherein the HMW component has a $M_w$ ranging from about 50,000 g/mol to about 1,000,000 g/mol, and is present in the PE resin in an amount of from greater than about 0 wt. % to less than about 100 wt. %, based on the total polymer weight. Element 24: wherein polymerization conditions include the presence of a polymerization catalyst selected from chromium catalysts, Ziegler-Natta catalysts, metallocene catalysts, or combinations thereof. Element 25: further comprising forming the polymer product into a large diameter pipe, wherein large diameter ranges from about 8 inches to about 78 inches. Element 26: wherein a peroxide is not added to the polymer product prior to forming the pipe. Element 27: wherein the diene is introduced at a level in the range of from about 1 ppm to about 1000 ppm based on a diluent. Element 28: wherein the diene is selected from 1,5-hexadiene, 1,3-butadiene, isoprene, 1,4-pentadiene; 1,6-heptadiene; 1,7-octadiene; 1,4-hexadiene; 1,9-decadiene; or combinations thereof. Element 29: wherein the polymer is a bimodal polyethylene (PE) copolymer. Element 30: wherein the bimodal PE copolymer comprises a high molecular weight (HMW) component and a low molecular weight component (LMW), and wherein the method further comprises adding the diene to a first polymerization zone in which the HMW component is produced, introducing the diene into a second polymerization zone in which the LMW component is produced, or introducing the diene into both the first and second polymerization zones. Element 31: wherein the first polymerization zone is upstream of the second polymerization zone. Element 32: wherein the first polymerization zone is downstream of the second polymerization zone. Element 33: further comprising adjusting the type of diene, the amount of diene, or both the type and the amount of diene introduced into the first polymerization zone, the second polymerization zone, or both, to alter at least one property of the PE copolymer. Element 34: wherein the presence of the diene during production of the polymer forms cross-linking in situ, and wherein no cross-linking agent is incorporated into the polymer downstream of the dual reactors. Element 35: wherein at least one of the dual loop slurry reactors comprises a Ziegler-Natta catalyst. Element 36: wherein the polymer is bimodal polyethylene. Element 37: wherein the diene is present at said level in the/a polymerization feed. Element 38: wherein the diene is present at said level within a polymerization reactor.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

What is claimed is:

1. A method comprising:
introducing a polymerization feed comprising an ethylene, a diluent selected from the group consisting of propane, cyclohexane, isobutane, n-butane, n-pentane, isopentane, neopentane, and n-hexane, and a diene to a first polymerization zone and a second polymerization zone of a polymerization system comprising the first and the second polymerization zones in series, wherein the diene is present in the polymerization feed to each zone at a level of less than or equal to about 20 ppm based on an amount of the diluent in said polymerization feed to each zone,
polymerizing the ethylene and the diene to produce a polymer product, wherein the polymer product is a bimodal polyethylene resin, and wherein the bimodal polyethylene resin comprises a high molecular weight (HMW) component and a low molecular weight (LMW) component, wherein the HMW component and the LMW component comprise the diene; and
adjusting the amount of the diene, the type of the diene, or both the amount and the type of the diene introduced into the first polymerization zone and the second polymerization zone to alter melt strength, impact strength, crossover modulus, or a combination thereof of the polymer product.

2. The method of claim 1, wherein the diene is selected from dienes having a boiling point of less than or equal to about 110° C.

3. The method of claim 1, wherein the diene is selected from the group consisting of conjugated dienes, non-conjugated dienes, and combinations thereof.

4. The method of claim 3, wherein the diene is selected from the group consisting of C6-C15 straight chain hydrocarbon non-conjugated dienes, C6-C15 branched chain hydrocarbon non-conjugated dienes, C6-C15 cyclic hydrocarbon non-conjugated dienes, and combinations thereof.

5. The method of claim 3, wherein the non-conjugated diene is selected from the group consisting of straight chain acyclic dienes; branched chain acyclic dienes; single ring alicyclic dienes; multi-ring alicyclic fused and bridged ring dienes; and combinations thereof.

6. The method of claim 3, wherein the diene is a conjugated diene selected from the group consisting of 1,3-hexadiene, 2,4-hexadiene, 1,3-pentadiene, 1,3-butadiene, 2-methyl-1,3-butadiene, 4-methyl-1,3-pentadiene, 1,3-cyclopentadiene, and combinations thereof.

7. The method of claim 1, wherein the polymer product exhibits a $\lambda$, which is the number of long chain branches (LCB) per million carbon atoms, that is greater than that of a polymer product produced via the same method but absent the presence of the diene.

8. The method of claim 7, wherein the polymer product exhibits a $\lambda$, greater than or equal to about 15 LCB/$10^6$ carbons.

9. The method of claim 1, wherein the polymer product exhibits an LCB content, as determined by $\alpha$, which is the fraction of the total carbons that are long chain vertexes determined according to the equation:

$$\alpha = \frac{\upsilon_3}{M_W / M_0}$$

where
$\upsilon_3$=number of long branch vertexes,
$M_w$=weight average molecular weight (g/mol), and
$M_0$=molecular weight of repeating unit (Da),
that is greater than that of a polymer product produced via the same method but absent the presence of the diene.

10. The method of claim 1, wherein the polymerization system comprises one or more reactors selected from the group consisting of loop slurry reactors, fluidized bed gas phase reactors, multi-zone reactors, batch reactors, and CSTR reactors.

11. The method of claim 1, wherein the first and second polymerization zones in series comprise dual loop slurry reactors in series.

12. The method of claim 1,
wherein the LMW component has a weight average molecular weight ($M_w$) ranging from about 350 g/mol to about 40,000 g/mol; and
wherein the HMW component has a $M_w$ ranging from about 50,000 g/mol to about 1,000,000 g/mol.

13. The method of claim 1, wherein the LMW component has a weight average molecular weight ($M_w$) ranging from about 1,000 g/mol to about 40,000 g/mol, and wherein the HMW component has a $M_w$ ranging from about 50,000 g/mol to about 100,000 g/mol.

14. The method of claim 1, wherein the polymerization is carried out in the presence of a polymerization catalyst selected from the group consisting of chromium catalysts, Ziegler-Natta catalysts, metallocene catalysts, and combinations thereof.

15. A method comprising:
enhancing a long chain branching (LCB) of a bimodal polyethylene (PE) polymer comprising a high molecular weight (HMW) component and a low molecular weight (LMW) component while the bimodal PE polymer is being produced in a serial dual loop slurry reactor process by introducing a feed comprising an ethylene, optionally a comonomer, a diluent selected from the group consisting of propane, cyclohexane, isobutane, n-butane, n-pentane, isopentane, neopentane, and n-hexane, and a diene into a polymerization zone in which the HMW component is being produced and into a polymerization zone in which the LMW component is being produced, and adjusting the amount of the diene, the type of the diene, or both the amount and the type of the diene introduced into the polymerization zone in which the HMW component is being produced and the polymerization zone in which the LMW component is being produced, to alter melt strength, impact strength, crossover modulus, or a combination thereof of the bimodal PE polymer, and wherein the diene is introduced to each polymerization zone at a level of less than or equal to about 20 ppm in the feed to each zone based on an amount of the diluent present in the feed to each zone.

16. The method of claim 15, wherein the diene is selected from the group consisting of dienes having a boiling point of less than or equal to about 110° C.

17. The method of claim 15, wherein the diene is selected from the group consisting of conjugated dienes, non-conjugated dienes, and combinations thereof.

18. The method of claim 15, wherein the diene is selected from the group consisting of 1,5-hexadiene; 1,3-butadiene; isoprene; 1,4-pentadiene; 1,6-heptadiene; 1,7-octadiene; 1,4-hexadiene; 1,9-decadiene; and combinations thereof.

19. The method of claim 15, wherein the bimodal polyethylene polymer is a bimodal polyethylene (PE) copolymer, wherein the comonomer is present in an amount of less than about 0.5 wt. % based on the total weight of the copolymer, and wherein the comonomer is selected from the group consisting of propylene, 1-butene, 1-pentene, 1-hexene, 3-methyl-1-butene, 4-methyl-1-pentene, 1-heptene, 1-octene, 1-nonene, 1-decene, and mixtures thereof.

20. The method of claim 15, wherein at least one of the dual loop slurry reactors comprises a Ziegler-Natta catalyst.

21. A method comprising:
enhancing a long chain branching (LCB) of a bimodal polyethylene (PE) polymer comprising a high molecular weight (HMW) component and a low molecular weight (LMW) component while the bimodal PE polymer is being produced in the presence of a Ziegler-Natta catalyst by introducing a feed comprising an ethylene, optionally a comonomer, a diluent selected from the group consisting of propane, cyclohexane, isobutane, n-butane, n-pentane, isopentane, neopentane, and n-hexane, and a diene to a first polymerization zone in which the HMW component is being produced and into a second polymerization zone in which the LMW component is being produced, wherein the diene is introduced to each polymerization zone at a level of less than or equal to about 20 ppm in the feed to each zone based on an amount of the diluent in the feed to each zone, and adjusting the amount of the diene, the type of the diene, or both the amount and the type of the diene introduced into the first polymerization zone, and the second polymerization zone to alter melt strength, impact strength, crossover modulus, or a combination thereof of the bimodal polyethylene (PE) polymer.

22. The method of claim 21, wherein the bimodal polyethylene polymer is a bimodal polyethylene copolymer, wherein the comonomer is present in an amount of less than about 0.5 wt. % of a total weight of the polymer, and wherein the comonomer is selected from the group consisting of propylene, 1-butene, 1-pentene, 1-hexene, 3-methyl-1-butene, 4-methyl-1-pentene, 1-heptene, 1-octene, 1-nonene, 1-decene, and mixtures thereof.

23. The method of claim 1 further comprising producing the HMW component in the first polymerization zone, and wherein the first polymerization zone is upstream of the second polymerization zone.

24. The method of claim 21, wherein the diene is selected from the group consisting of dienes having a boiling point of less than or equal to about 110° C.

25. The method of claim 21, wherein the diene is selected from the group consisting of 1,5-hexadiene; 1,3-butadiene; isoprene; 1,4-pentadiene; 1,6-heptadiene; 1,7-octadiene; 1,4-hexadiene; 1,9-decadiene; and combinations thereof.

* * * * *